US009769102B2

(12) United States Patent
Yamada et al.

(10) Patent No.: US 9,769,102 B2
(45) Date of Patent: *Sep. 19, 2017

(54) INFORMATION SHARING SYSTEM, INFORMATION SHARING METHOD AND TERMINAL DEVICE

(71) Applicant: AISIN AW CO., LTD., Anjo-shi, Aichi-ken (JP)

(72) Inventors: Hideo Yamada, Kawasaki (JP); Ryuya Muramatsu, Higashikurume (JP)

(73) Assignee: AISIN AW CO., LTD., Anjo (JP)

( * ) Notice: Subject to any disclaimer, the term of this patent is extended or adjusted under 35 U.S.C. 154(b) by 372 days.

This patent is subject to a terminal disclaimer.

(21) Appl. No.: 14/412,620

(22) PCT Filed: Mar. 6, 2013

(86) PCT No.: PCT/JP2013/056069
§ 371 (c)(1),
(2) Date: Jan. 2, 2015

(87) PCT Pub. No.: WO2014/013748
PCT Pub. Date: Jan. 23, 2014

(65) Prior Publication Data
US 2015/0149932 A1 May 28, 2015

(30) Foreign Application Priority Data

Jul. 17, 2012 (JP) .................................. 2012-158715

(51) Int. Cl.
*G06F 3/048* (2013.01)
*H04L 12/58* (2006.01)
(Continued)

(52) U.S. Cl.
CPC ............ *H04L 51/16* (2013.01); *G06F 3/0482* (2013.01); *G06F 3/04842* (2013.01); *G06F 17/30654* (2013.01); *G06Q 30/02* (2013.01)

(58) Field of Classification Search
CPC ......... G06F 17/306054; G06F 3/04842; G06F 17/30654; G06Q 30/02; G06Q 30/06; H04L 51/16
See application file for complete search history.

(56) References Cited

U.S. PATENT DOCUMENTS

| 6,064,978 A | 5/2000 | Gardner et al. |
| 7,069,028 B2 | 6/2006 | Natsuno |

(Continued)

FOREIGN PATENT DOCUMENTS

| JP | 2003-223462 A | 8/2003 |
| JP | 2009-134443 A | 6/2009 |

(Continued)

OTHER PUBLICATIONS

Lei, Jiang. "A Study on the Key Technology of Product-Directed Opinion Mining." A Thesis for a Master's Degree in Engineering. Jun. 2010. pp. 12-14. Harbin Institute of Technology.

(Continued)

*Primary Examiner* — William Bashore
*Assistant Examiner* — Gregory A Distefano
(74) *Attorney, Agent, or Firm* — Oliff PLC

(57) ABSTRACT

An information sharing system includes a computer network formed of terminals and a server and allows information about a posted message to be shared among users. The system or a terminal acquires a question message input via the terminal together with positional information associated with the question message and causes the acquired question message to be accessible to the users. The system or terminal acquires an answer message input by a respondent via the terminal as an answer to the question message and causes the acquired answer message to be accessible to the users. The system or terminal acquires positional information of the respondent and restricts the respondent accessing the ques- (Continued)

tion message on the basis of question positional information that is the positional information associated with the question message and respondent positional information that is the acquired positional information of the respondent.

13 Claims, 26 Drawing Sheets

(51) Int. Cl.
| | | |
|---|---|---|
| G06Q 30/02 | | (2012.01) |
| G06F 3/0482 | | (2013.01) |
| G06F 3/0484 | | (2013.01) |
| G06F 17/30 | | (2006.01) |

(56) References Cited

U.S. PATENT DOCUMENTS

| | | | | |
|---|---|---|---|---|
| 8,751,427 | B1* | 6/2014 | Mysen ................. | H04L 67/306 705/14.58 |
| 2003/0126150 | A1 | 7/2003 | Chan | |
| 2006/0047615 | A1 | 3/2006 | Ravin et al. | |
| 2007/0260587 | A1* | 11/2007 | Mohan ................. | G06Q 10/06 |
| 2007/0281689 | A1 | 12/2007 | Altman et al. | |
| 2008/0133671 | A1* | 6/2008 | Kalaboukis ........... | H04L 12/58 709/206 |
| 2009/0287763 | A1 | 11/2009 | Svendsen et al. | |
| 2010/0198869 | A1 | 8/2010 | Kalaboukis et al. | |
| 2010/0332326 | A1 | 12/2010 | Ishai | |
| 2011/0055230 | A1 | 3/2011 | Castro et al. | |
| 2011/0153312 | A1* | 6/2011 | Roberts ............. | G06F 17/30654 704/9 |
| 2011/0196922 | A1* | 8/2011 | Marcucci ............ | G06Q 10/10 709/204 |
| 2012/0173992 | A1 | 7/2012 | D'Angelo et al. | |
| 2012/0185484 | A1 | 7/2012 | Jones et al. | |
| 2012/0252497 | A1* | 10/2012 | Altscher ............. | H04W 4/02 455/456.3 |
| 2013/0132431 | A1* | 5/2013 | Platt ................. | G06F 17/30241 707/770 |
| 2013/0139070 | A1* | 5/2013 | Baldwin ............. | G06Q 50/01 715/753 |
| 2014/0137001 | A1 | 5/2014 | Baldwin et al. | |
| 2014/0213302 | A1 | 7/2014 | Yang et al. | |
| 2015/0120718 | A1 | 4/2015 | Luo et al. | |

FOREIGN PATENT DOCUMENTS

| | | | |
|---|---|---|---|
| JP | 2009-204460 A | | 9/2009 |
| JP | 2009-211685 A | | 9/2009 |
| JP | 2012 059005 A | * | 3/2012 |
| JP | 2012-059005 A | | 3/2012 |
| JP | 2012-079276 A | | 4/2012 |

OTHER PUBLICATIONS

Binbin, He. "A Study on a Location-Based Social Service for Handheld Mobile Devices." A Thesis for a Master's Degree. Apr. 28, 2010. pp. 50-55. Hunan University.
Shoshu Boku, Chizujo ni Onsei Comment o Toko Dekiru iPhone Apuri, Car Navi tono Renkei mo Kano, [online], Apr. 5, 2012, ITmedia, (retrieval date Apr. 15, 2013), http://monoist.atmarkit.co.jp/mn/articles/1204/05/news059.html.
Dated Apr. 23, 2013 Search Report issued in International Application No. PCT/JP2013/056069.
Tannenbaum et al., Andrew S. "Distributed Systems: Principles and Paradigms". Second Edition. Vrije Universiteit Amsterdam, the Netherlands. Pearson Education, Inc. pp. 1-68. ISBN 0-13-237227-5.
Harmon, James E. Dojo: Using the Dojo Javascript Library to Build Ajax Applications. Chapter 2, pp. 25-26. Pearson Education, Inc. ISBN 0-13-235804-2.
Firtman, Maximiliano. "Programming the Mobile Web". First Edition, Jul. 2010. O'Reilly Media, Inc. ISBN 978-0-596-80778-8.
Wikipedia: "Mobile device", Internet Article, Jun. 22, 2012 (Jun. 22, 2012), XP055187935, Retrieved from the Internet: URL:http://en.wikipedia.org/w/index.php?title=Mobile_device$oldid=498868853 [retrieved on May 7, 2015] "the whole document".
Wikipedia: "Location-based service", Internet Article, Jun. 30, 2012 (Jun. 30, 2012), XP055187932, Retrieved from the Internet: URL:http/en.wikipedia.org/w/index.php?title=Location-based_service&oldid=500022175 [retrieved on May 7, 2015] *the whole document*.
Wikipedia: "Automotive navigation system", Internet Article, Jul. 12, 2012 (Jul. 12, 2012), XP055187927, Retrieved from the Internet: URL:http//en.wikipedia.org/w/index.php?title=Automotive_navigation_system&oldid=501919995 [retrieved on May 7, 2015] *the whole document*.
Wikipedia: "GPS navigation device", Internet Article, Jul. 10, 2012 (Jul. 10, 2012), XP055187929, Retrieved from the Internet: URL:http://en.wikipedia.org/w/index.php?title=GPS_navigation_device&oldid=501570915 [retrieved on May 7, 2015] *the whole document.
Wikipedia: "TomTom", Internet Article, Jul. 10, 2012 (Jul. 10, 2012), XP055187994, Retrieved from the Internet: URL:http://en.wikipedia.org/w/index.php?title=TomTom&oldid=501549172 [retrieved on May 7, 2012] *the whole document*.
Wikipedia: "Google Maps", Internet Article, Jul. 13, 2012 (Jul. 13, 2012), XP055189172, Retrieved from the Internet: URL:http://en.wikipedia.org/w/index.php?title=Google_Maps&oldid=502120602 [retrieved on May 13, 2015] *the whole document*.
Wikipedia: "Geosocial networking", Internet Article, Jan. 12, 2012 (Jan. 12, 2012), XP055191659, Retrieved from the Internet: URL:http://en.wikipedia.org/w/index.php?title=Geosocial_networking&oldid=470884560 [retrieved on May 26, 2015] *the whole document*.
Daniel Lüders: "Leiten mit System—Mit neuer Navi-Technik auf def Überholspur", c't 26/2008, Dec. 8, 2008 (Dec. 8, 2008), pp. 160-163, XP055016185, Retrieved from the Internet: URL:http://www.heise.de/artikel-archiv/ct/2008/26/160_kiosk [retrieved on Jan. 11, 2012] *the whole document*.
Achim Barczok: "Zielsicher—Navis entdecken das Internet, planen die Fahrt ins Blaue und werden lernfähig", c't 26/2008, Dec. 8, 2008 (Dec. 8, 2008), pp. 164-169, XP055188157, Retrieved from the Internet: URL:http://www.heise.de/artikel-archiv/ct/2008/26/164/@00350@/ct.08.26.164-169.pdf [retrieved on May 7, 2015] *the whole document*.
Achim Barczok: "Die Netz-Navis—Navigationsgeräte mit Internetanbingung", c/t 4/2010, Feb. 1, 2010 (Feb. 1, 2010), pp. 132-135, XP055188158, Retrieved from the Internet: URL:http://www.heise.de/artikel-archiv/ct/2010/04/132/@00250@/ct.10.04.132-135.pdf [retrieved on May 7, 2015] *the whole document*.
Achim Barczok: "Taschen-Führer—Smartphone-Navigation für Android, iPhone und Co.", c't 17/2010, Aug. 2, 2010 (Aug. 2, 2010), pp. 80-85, XP055188159, Retrieved from the Internet: URL:http://www.heise.de/artikel-archiv/ct/2010/17/080/@00350@/ct. 10.17.080-085,pdf [retrieved on May 7, 2015] *the whole document*.
Axel Kossel: "Smartlotsen—Navigations-Apps für Android und iOS", c't 13/2011, Jun. 6, 2011 (Jun. 6, 2011), pp. 100-107, XP055189122, Retrieved from the Internet: URL:http://www.heise.de.artikel-archiv/ct/2011/13/100/@00350@/ct.11.13.100-107.pdf [retrieved on May 13, 2015] *the whole document*.
Achim Barczok et al: "Stau-Jäger—Kostenlose Echtzeitverkehrsdienste", c't 21/2011, Sep. 26, 2011 (Sep. 26, 2011), pp. 79-79, XP055189123, Retrieved from the Internet: URL:http://www.heise.de/artikel-archiv/ct/2011/21/079/@00250@/ct.11.21.079.pdf [retrieved on May 13, 2015] *the whole document*.
Dated Jun. 10, 2015 Supplementary Search Report issued in European Application No. 13 82 0230.4.
Dated Jul. 2, 2013 International Search Report issued in International Patent Application No. PCT/JP2013/056071.

(56) References Cited

OTHER PUBLICATIONS

U.S. Appl. No. 14/412,586, filed Jan. 2, 2015 in the name of Hideo Yamada et al.
Dated Dec. 3, 2015 Office Action issued in U.S. Appl. No. 14/412,586.
Dated Mar. 31, 2016 Notice of Allowance issued in U.S. Appl. No. 14/412,586.

* cited by examiner

FIG.3

POSTED MESSAGE INFORMATION

| POSTED TIME | TYPE | QUESTION LOCATION | USER ID | POSTED SENTENCE |
|---|---|---|---|---|
| 2012/8/23 12:23 | QUESTION MESSAGE (No.123) | x1,y1 | abc111 | "HOW ABOUT TRAFFIC CONGESTION CONDITION ?" |
| 2012/8/23 13:01 | ANSWER MESSAGE (TO No.123) | — | def222 | "CONSIDERABLY HEAVY" |
| 2012/8/23 13:15 | ANSWER MESSAGE (TO No.123) | — | ghi333 | "SLIGHTLY EASED" |
| 2012/8/23 15:34 | QUESTION MESSAGE (No.124) | x2,y2 | jkl444 | "HOW IS WEATHER NOW ?" |
| 2012/8/23 15:51 | ANSWER MESSAGE (TO No.124) | — | mno555 | "CLOUDY" |
| ... | ... | ... | ... | ... |

F I G . 4
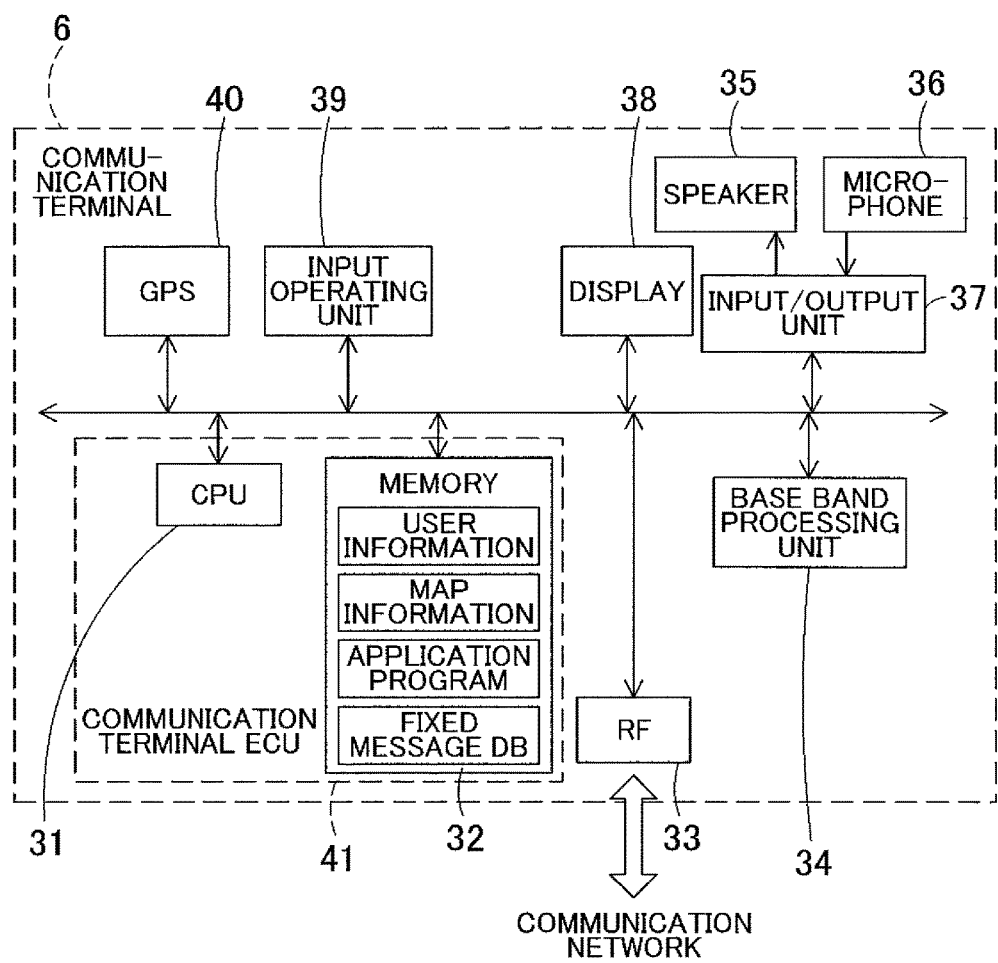

FIG. 20

FIXED MESSAGE DB

| TYPE | SENTENCE | REAL TIME |
|---|---|---|
| QUESTION MESSAGE | HOW ABOUT TRAFFIC CONGESTION CONDITION ? | ○ |
| QUESTION MESSAGE | HOW IS WEATHER NOW ? | ○ |
| QUESTION MESSAGE | DOES THIS SHOP SERVE DELICIOUS FOOD ? | × |
| ... | ... | ... |
| ANSWER MESSAGE | NOT HEAVY | ---- |
| ANSWER MESSAGE | CONGESTED | ---- |
| ANSWER MESSAGE | SHINY | ---- |
| ANSWER MESSAGE | RAINY | ---- |
| ANSWER MESSAGE | DELICIOUS | ---- |
| ANSWER MESSAGE | LESS THAN DELICIOUS | ---- |
| ... | ... | ... |

FIG. 21

EXAMPLE MESSAGE 1. "IS IT RAINY ?"

A. "RAINY" IS WORD THAT INDICATES TO REQUIRE ANSWER IN REAL TIME
B. SYNTAX INDICATES TO REQUIRE ANSWER IN REAL TIME BECAUSE OF PRESENT-TENSE QUESTION

DETERMINE THAT "ANSWER IN REAL TIME IS REQUIRED"

2/ EXAMPLE MESSAGE 2. "WAS IT RAINY YESTERDAY ?"

A. "RAINY" IS WORD THAT INDICATES TO REQUIRE ANSWER IN REAL TIME
B. SYNTAX DOES NOT INDICATE TO REQUIRE ANSWER IN REAL TIME BECAUSE OF PAST-TENSE QUESTION

DETERMINE THAT "ANSWER IN REAL TIME IS NOT REQUIRED"

3/ EXAMPLE MESSAGE 3. "IS THIS SHOP CROWDED ?"

A. "CROWDED" IS WORD THAT INDICATES TO REQUIRE ANSWER IN REAL TIME
B. SYNTAX INDICATES TO REQUIRE ANSWER IN REAL TIME BECAUSE OF PRESENT-TENSE QUESTION

DETERMINE THAT "ANSWER IN REAL TIME IS REQUIRED"

4/ EXAMPLE MESSAGE 4. "DOES THIS SHOP SERVE DELICIOUS FOOD ?"

A. WORD THAT INDICATES TO REQUIRE ANSWER IN REAL TIME IS NOT INCLUDED

DETERMINE THAT "ANSWER IN REAL TIME IS NOT REQUIRED"

F I G . 29
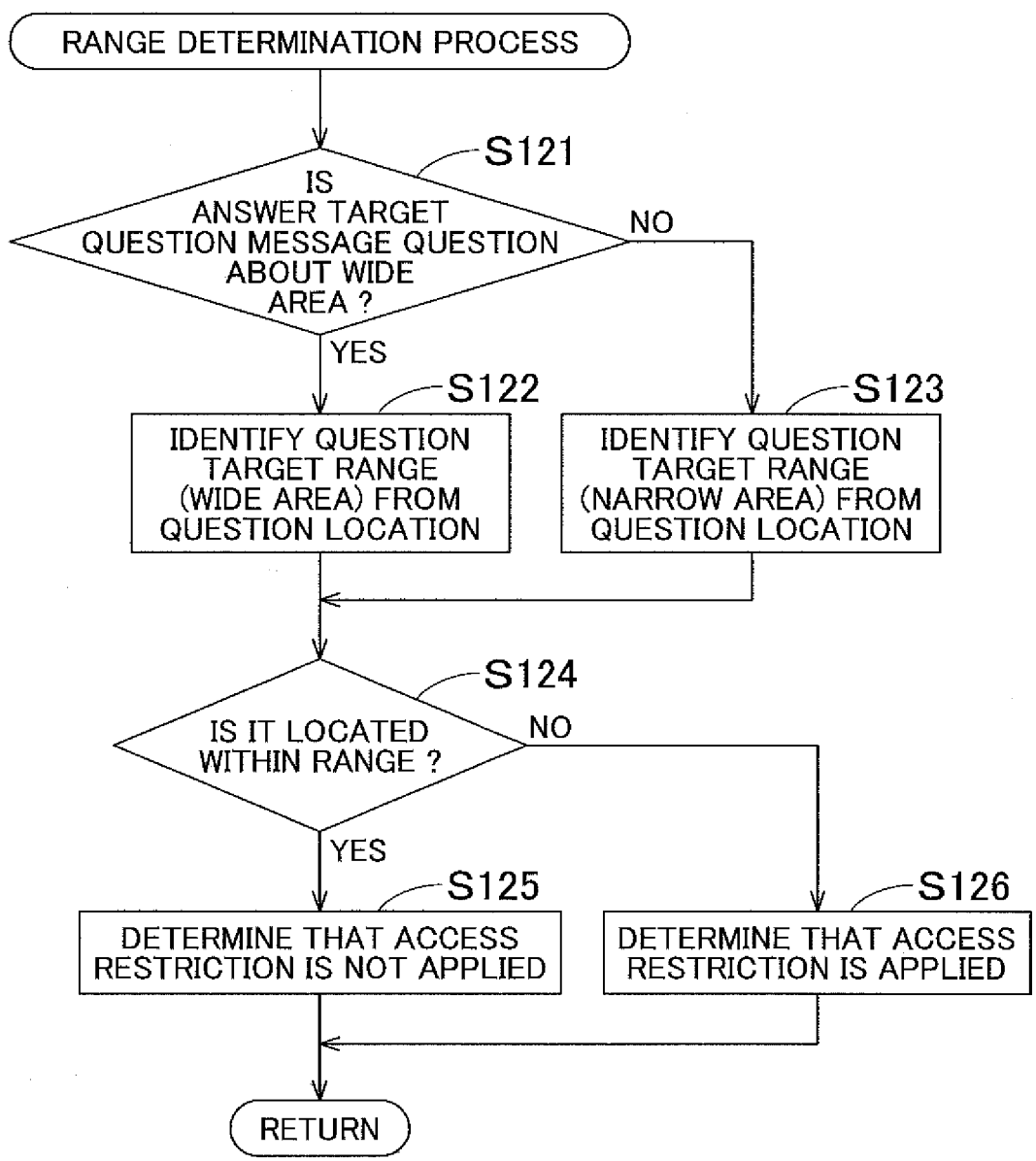

F I G . 30
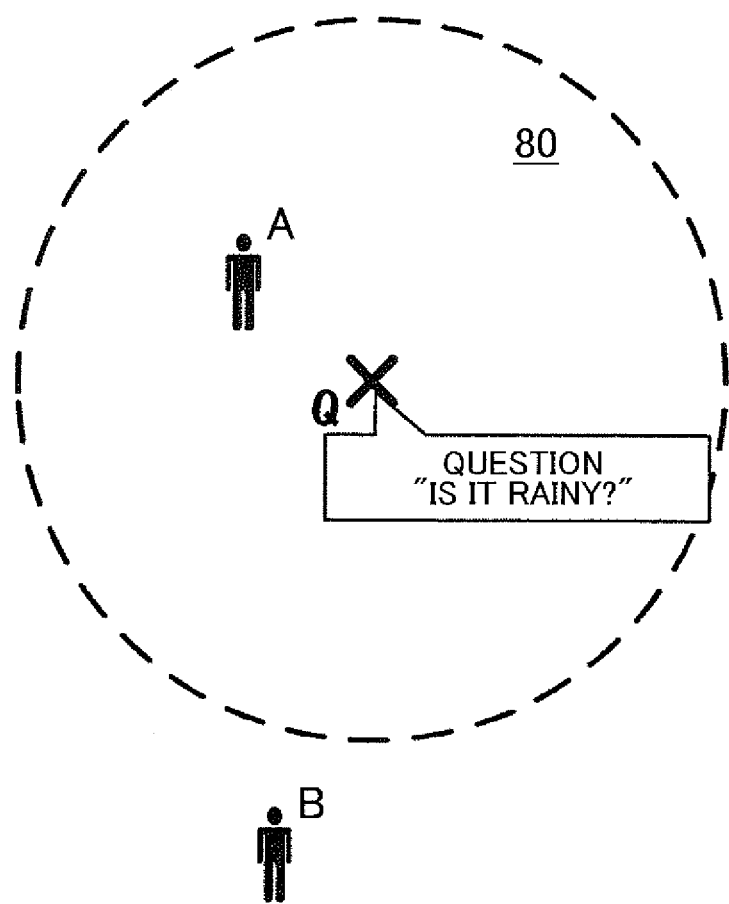

INFORMATION SHARING SYSTEM, INFORMATION SHARING METHOD AND TERMINAL DEVICE

TECHNICAL FIELD

Related technical fields include information sharing systems, information sharing methods and terminal devices by which information about a message posted on a computer network is shared among users.

BACKGROUND ART

In recent years, there are provided systems that allow a user to post a question message on a computer network via a terminal and similarly allow a user to post an answer message to the question message on the network. Furthermore, in these systems, in addition to a questioner and a respondent, a third person is also allowed to access the question message and the answer message that are posted on the network. There are various questions, and, for example, questions about a traffic condition, such as traffic congestion and a suspension of service, a crowded situation of a shop and a weather condition, are allowed.

Here, in the above-described systems, it is advantageously possible to quickly acquire the latest information at a remote place; however, there is a problem that it is difficult to ensure the reliability of information. That is, any user is basically allowed to answer a posted question message, so a user who cannot have a correct answer is also allowed to post an answer message, and it is difficult for a questioner or a third person to judge whether the answer message is a correct answer. Then, for example, Japanese Patent Application Publication No. 2009-211685 (JP 2009-211685 A) suggests a technique for, at the time of accumulating answer messages posted on a network, also acquiring pieces of positional information about mobile terminals that have transmitted the answer messages and then setting only pieces of answer information, transmitted by the mobile terminals located within a meeting place in which a question is asked in advance, for an accumulation target.

RELATED ART DOCUMENT

Patent Document 1: Japanese Patent Application Publication No. 2009-211685 (JP 2009-211685 A) (from page 8 to page 11, FIG. 9)

SUMMARY

Here, in the technique of the above-described Patent Document 1, it is possible to restrict respondents to only users present within a predetermined range. In a situation in which only users present within a predetermined range can have a correct answer, respondents may be restricted to only the users present within the predetermined range as in the case of Patent Document 1; however, users who can have a correct answer actually fluctuate question by question.

For example, for a question about Location A, users present around Location A can have a correct answer, so it is desirable to restrict respondents to the users present around Location A. On the other hand, for a question about Location B different from Location A, users present around Location B not Location A can have a correct answer, so it is desirable to restrict respondents to the users present around Location B. However, in the technique of Patent Document 1, it is not a technique for applying restriction on answer messages on the basis of a location associated with a question message and a location of each respondent, and answers are just restricted on the basis of a location at which an answer is made to a question, so there is a problem that it is not possible to restrict users who are respondents to appropriate users who can have an answer question by question.

Exemplary embodiments of the broad inventive principles described herein provide an information sharing system, an information sharing method and a terminal device that are able to, at the time of accessing an answer message to a question message posted on a computer network, restrict access to only an answer message that is answered by an appropriate user who can have an answer, and that are able to improve the reliability of information.

According to exemplary embodiments, an information sharing system in which, on a computer network formed of terminals of users and a server, information about a posted message posted by a user is shared among the users, includes: question message information acquisition means for acquiring a question message input via the terminal together with positional information associated with the question message; question message accessing means for causing the question message acquired by the question message information acquisition means to be accessible to the users on the computer network; answer message information acquisition means for acquiring an answer message input via the terminal as an answer to the question message; answer message accessing means for causing the answer message acquired by the answer message information acquisition means to be accessible to the users on the computer network; respondent positional information acquisition means for acquiring positional information of a respondent that is the user who inputs the answer message; and access restriction means for restricting a questioner that is the user who posted the question message from accessing the answer message on the basis of question positional information that is the positional information associated with the question message and respondent positional information that is the positional information of the respondent, acquired by the respondent positional information acquisition means.

The information sharing system according to embodiments further includes restriction determination means for determining whether restriction is applied by the access restriction means on the basis of contents of the question message, wherein the access restriction means restricts the questioner from accessing the answer message when the restriction determination means has determined that restriction is applied by the access restriction means.

The information sharing system according to embodiments further includes content determination means for determining whether the question message is a question that requires an answer in real time on the basis of the contents of the question message, wherein the restriction determination means determines that restriction is applied by the access restriction means when the content determination means has determined that the question message is a question that requires an answer in real time. The question that requires an answer in real time is a question to which an answer may change with a lapse of time even with the same question, and, for example, a question, or the like, for specifying the state of an incident (for example, a present weather condition, a present traffic congestion condition) at the present time point or within a set period of time from the present time point for an incident that fluctuates with time corresponds to this question.

The information sharing system according to embodiments further includes correspondence relationship information acquisition means for acquiring correspondence relationship information that associates whether it is a question that requires an answer in real time with each of multiple-type fixed messages, wherein the content determination means determines whether the question message is a question that requires an answer in real time on the basis of the correspondence relationship information when the question message corresponds to any one of the multiple-type fixed messages.

In the information sharing system according to embodiments, the content determination means determines whether the question message is a question that requires an answer in real time by performing a syntactic analysis on the question message.

In the information sharing system according to embodiments, the access restriction means sets a range of the respondent who posts the answer message, to which restriction on access is applied, on the basis of a relationship between the question positional information and the respondent positional information.

In the information sharing system according to embodiments, the access restriction means applies restriction on access to the answer message that is posted from the respondent who is located a predetermined distance or longer apart from a location that is identified by the question positional information.

In the information sharing system according to embodiments, the access restriction means applies restriction on access to the answer message that is posted from the respondent who is not located at a location that is identified by the question positional information within a last predetermined period of time.

In the information sharing system according to embodiments, the access restriction means sets the range of the respondent who posts the answer message, to which restriction on access is applied, on the basis of the relationship between the question positional information and the respondent positional information that indicates a location of the respondent at the time point at which the question message was posted or the time point at which the answer message to the question message is posted.

In the information sharing system according to embodiments, the answer message accessing means includes: answer message transmitting means for transmitting the answer message, acquired by the answer message information acquisition means, from the terminal to the server; answer message storage means for storing the answer message, transmitted by the answer message transmitting means, in the server; answer message distributing means for distributing the answer message, stored in the server by the answer message storage means, from the server to the terminal that intends to access the answer message; and answer message outputting means for outputting the answer message, distributed by the answer message distributing means, through the terminal, and the access restriction means restricts the questioner from accessing the answer message by restricting the answer message transmitting means from transmitting the answer message from the terminal to the server.

In the information sharing system according to the present invention, the question message information acquisition means acquires information that identifies a location on a map, specified by the questioner, as the question positional information.

In the information sharing system according to embodiments, the question message accessing means displays a map image on the terminal and displays a selection target at the location that is identified by the question positional information, associated with the question message acquired by the question message information acquisition means, on the map image displayed on the terminal, and, when the selection target has been selected by the user, the question message accessing means outputs the question message, acquired by the question message information acquisition means, from the terminal.

In the information sharing system according to embodiments, the answer message accessing means outputs the answer message together with the question message when the selection target displayed at the location that is identified by the question positional information, associated with the question message to which the answer message is made, has been selected by the user.

According to embodiments, an information sharing method in which, on a computer network formed of terminals of users and a server, information about a posted message posted by a user is shared among the users, includes: question message information acquisition step of acquiring a question message input via the terminal together with positional information associated with the question message; question message accessing step of causing the question message acquired in the question message information acquisition step to be accessible to the users on the computer network; answer message information acquisition step of acquiring an answer message input via the terminal as an answer to the question message; answer message accessing step of causing the answer message acquired in the answer message information acquisition step to be accessible to the users on the computer network; respondent positional information acquisition step of acquiring positional information of a respondent that is the user who inputs the answer message; and access restriction step of restricting a questioner that is the user who posted the question message from accessing the answer message on the basis of question positional information that is the positional information associated with the question message and respondent positional information that is the positional information of the respondent, acquired in the respondent positional information acquisition step.

Furthermore, according to embodiments, a terminal device that constructs an information sharing system in which, on a computer network that is formed the terminal device and a server connected to the terminal device so as to be bidirectionally communicable, information about a posted message posted by a user is shared among a plurality of users, includes: question message information acquisition means for acquiring a question message input via an operating unit together with positional information associated with the question message; question message accessing means for causing the question message acquired by the question message information acquisition means to be accessible to the users on the computer network; answer message information acquisition means for acquiring an answer message input via the operating unit as an answer to the question message; answer message accessing means for causing the answer message acquired by the answer message information acquisition means to be accessible to the users on the computer network; respondent positional information acquisition means for acquiring positional information of a respondent that is the user who inputs the answer message; and access restriction means for restricting a questioner that is the user who posted the question message from accessing the answer message on the basis of question positional information that is the positional information associated with the question message and respondent positional information that is the positional information of the respondent, acquired by the respondent positional information acquisition means.

With the information sharing system having the above configuration, the questioner who posted the question message is restricted from accessing the answer message on the basis of the positional information associated with the question message and the positional information of the respondent, so, at the time when the questioner accesses the answer message to the question message posted on the computer network, it is possible to restrict access to only an answer message answered by an appropriate respondent who can have an answer. As a result, it is possible to improve the reliability of information that is posted from the user.

With the information sharing system, it is determined whether restriction on access to the answer message is applied to the questioner on the basis of the contents of the question message, so it is possible to appropriately restrict access to only a reasonable answer message to which restriction on access should be applied. As a result, it is possible to collect information from wider-target users while improving the reliability of information.

With the information sharing system, particularly, when the question message is a question that requires an answer in real time, the questioner is restricted from accessing the answer message, so it is possible to appropriately apply restriction on access such that only an answer in real time is obtained for a question that requires an answer in real time.

With the information sharing system, when the question message corresponds to the fixed message, it is determined whether the question message is a question that requires an answer in real time on the basis of the type of the fixed message, so it is possible to accurately determine, from the sentence of the question message, whether the question message is a question that requires an answer in real time.

With the information sharing system, it is determined whether the question message is a question that requires an answer in real time by performing a syntactic analysis on the question message, so it is possible to accurately determine, from the sentence of the question message, whether the question message is a question that requires an answer in real time.

With the information sharing system, the range of a respondent who posts the answer message, to which restriction on access is applied, is set on the basis of the relationship between the positional information associated with the question message and the positional information of the respondent, so it is possible to restrict access to only an answer message that is posted from an appropriate respondent who is present at a location at which the respondent can have an answer.

With the information sharing system, restriction on access is applied to the answer message that is posted from the respondent who is located at the predetermined distance or longer apart from the location that is identified by the positional information associated with the question message, so it is possible to restrict access to only an answer message that is posted from an appropriate respondent by applying restriction on access to an answer message that is posted from a respondent present at a location at which the respondent cannot have an answer.

With the information sharing system, restriction on access is applied to the answer message that is posted from the respondent who is not located at the location that is identified by the positional information associated with the question message within the last predetermined period of time, so it is possible to restrict access to only an answer message that is posted from an appropriate respondent by applying restriction on access to an answer message that is posted from a respondent who is present at a location at which the respondent cannot have an answer.

With the information sharing system, the range of the respondent who posts the answer message, to which restriction on access is applied, is set on the basis of the relationship between the positional information associated with the question message and the positional information that indicates the location of the respondent at the time point at which the question message was posted or the time point at which the answer message to the question message is posted, so it is possible to restrict access to only an answer message that is posted from an appropriate respondent present at a location at which the respondent can have an answer.

With the information sharing system, the questioner is restricted from accessing the answer message by restricting transmission of the answer message from the terminal to the server after the answer message is input to the terminal, so, at the time when a respondent is caused to answer the question message posted on the computer network, it is possible to cause only the terminal of an appropriate respondent who can have an answer to transmit an answer message to the server. As a result, it is possible to improve the reliability of information that is posted from the user.

With the information sharing system, information that identifies the location on the map specified by the questioner is acquired as the question positional information, so it is possible to appropriately set the range of a respondent who can have an answer to the question message on the basis of the location on the map, specified by the questioner.

With the information sharing system, when the selection target displayed at the location that is identified by the question positional information associated with the question message is selected by the user, the question message is output from the terminal, so it is possible to output from the terminal a location on the map and a question message relating the location in association with each other. Thus, the user is able to easily select a question message, intended to be accessed, on the map and output the question message.

With the information sharing system, when the selection target displayed at the location that is identified by the question positional information associated with the question message is selected by the user, the answer message to the question message is output from the terminal together with the question message, so it is possible to output from the terminal a question message and an answer message in association with each other.

With the information sharing method, the questioner who posted the question message is restricted from accessing the answer message on the basis of the positional information associated with the question message and the positional information of the respondent, so, at the time when a questioner accesses an answer message to a question message posted on the computer network, it is possible to restrict access to only an answer message answered by an appropriate respondent who can have an answer. As a result, it is possible to improve the reliability of information that is posted from the user.

Furthermore, with the terminal device, the questioner who posted the question message is restricted from accessing the answer message on the basis of the positional information associated with the question message and the positional information of the respondent, so, at the time when a questioner accesses an answer message to a question message posted on the computer network, it is possible to restrict access to only an answer message answered by an appropriate respondent who can have an answer. As a result, it is possible to improve the reliability of information that is posted from the user.

BRIEF DESCRIPTION OF THE DRAWINGS

FIG. 3 is a view that shows an example of posted message information that is stored in a posted message information DB of a posted message management center.

FIG. 4 is a block diagram that schematically shows a control system of a communication terminal according to the first embodiment.

FIG. 20 is a view that shows an example of fixed messages that are stored in a fixed message DB.

FIG. 21 is a view that shows an example of analyzation of a question message through syntactic analysis.

FIG. 29 is a flowchart of a sub-process program of a range determination process according to the first embodiment.

FIG. 30 is a view that shows an example of a user of which a posted answer message is determined to be applied with restriction on access and a user of which a posted answer message is determined to be not applied with restriction on access in the range determination process.

EXEMPLARY EMBODIMENTS

Hereinafter, an information sharing system will be described in detail on the basis of a first embodiment and a second embodiment with reference to the accompanying drawings.

First Embodiment

Figure 1:
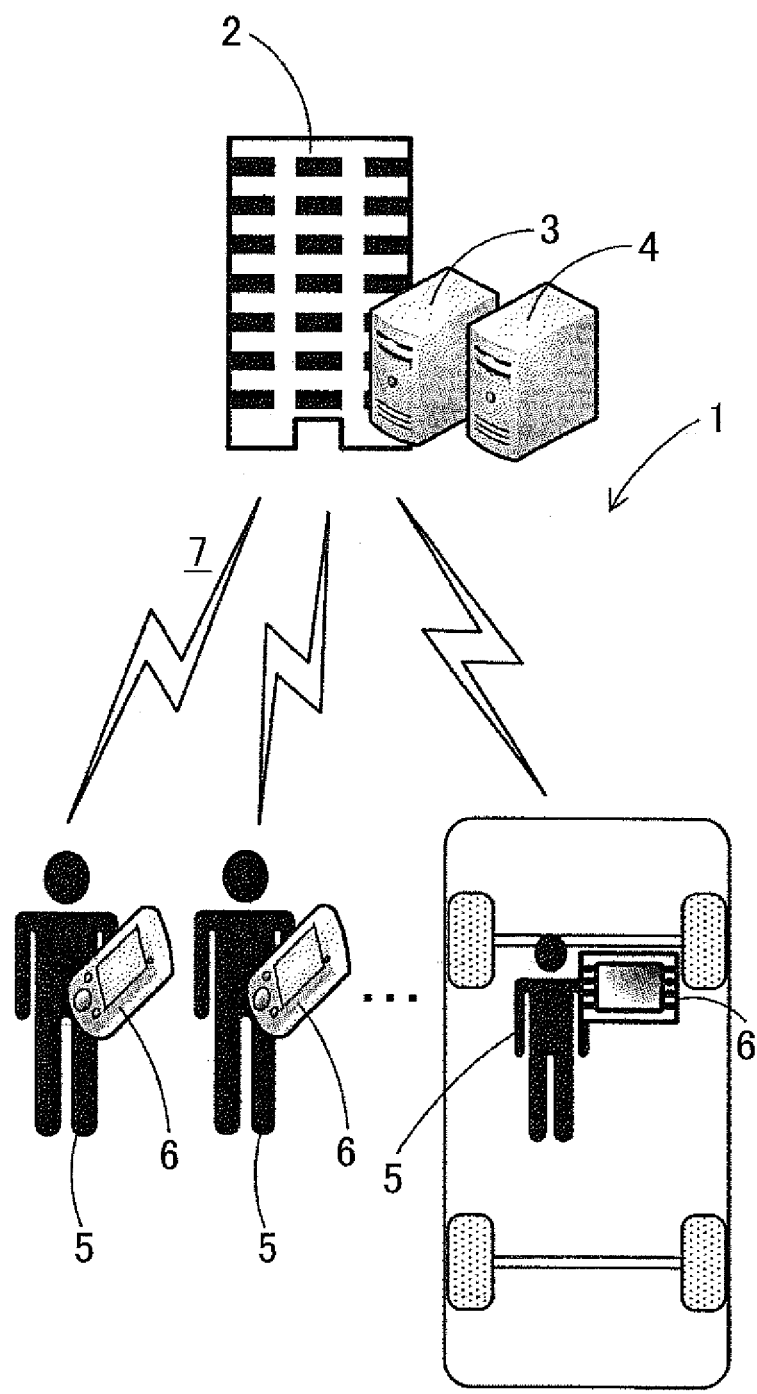
FIG. 1 is a schematic configuration view that shows an information sharing system according to a first embodiment.
Figure 2:
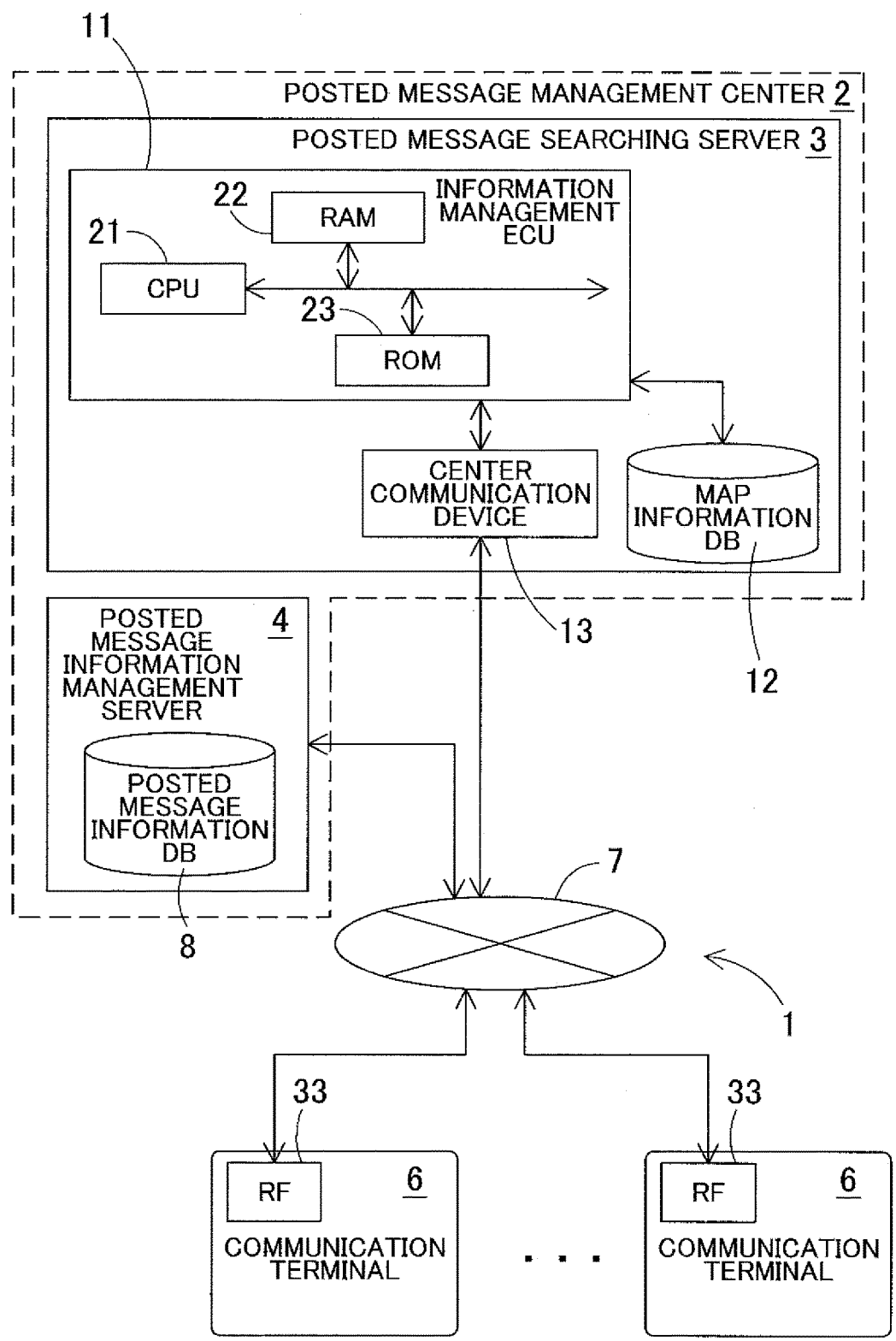
FIG. 2 is a block diagram that shows the configuration of the information sharing system according to the first embodiment.

First, the schematic configuration of an information sharing system 1 according to the first embodiment will be described with reference to FIG. 1 and FIG. 2. FIG. 1 is a schematic configuration view that shows the information sharing system 1 according to the first embodiment. FIG. 2 is a block diagram that shows the configuration of the information sharing system 1 according to the first embodiment.

As shown in FIG. 1, the information sharing system 1 according to the first embodiment is basically formed of a posted message searching server 3 of a posted message management center 2, a posted message information management server 4 of the same posted message management center 2, and communication terminals 6 respectively owned by users 5. Each communication terminal 6 may be a navigation system that serves as an in-vehicle device mounted on a vehicle, a cellular phone, a PDA, a smartphone, or the like. In addition, each user 5 may be moving by moving means other than a vehicle (for example, electric train, bicycle, foot, or the like) or may be in a non-moving state. In addition, the posted message management center 2 and each communication terminal 6 are configured to be able to exchange electronic data with each other via a communication network 7.

Here, the posted message searching server 3 is a server device that, when the user of the communication terminal 6 has issued a request to access a posted message posted on a computer network, extracts the posted message corresponding to the access request from among posted messages stored in the posted message management center 2 (more specifically, question messages, and, answer messages to the question messages) and then allows the user to access the contents of the posted message by distributing the posted message to the communication terminal 6. In addition, particularly, at the time of distributing a question message, the posted message searching server 3 assigns positional information associated with the extracted question message, and distributes the question message together with the assigned positioned information. The details of the posted message searching server 3 will be described later.

On the other hand, the posted message information management server 4 is a server device that manages blog, social network service (SNS), Twitter (registered trademark), chat, and the like (hereinafter, referred to as SNS, etc.) and that keeps and provides posted messages posted on the computer network in the SNS, etc. It is also possible for the user to post a message from a PC or another communication device, which is connectable to the computer network, other than the communication terminal 6. In the first embodiment, each posted message posted on the computer network is formed of a question message and an answer message to the question message.

Then, the posted message information management server 4 has a posted message information DB 8 as a storage medium, and a message posted on the computer network is sequentially stored in the posted message information DB 8 via the posted message management center 2. In addition, the posted message information DB 8 stores, together with the sentence of a posted message, posted time at which the posted message was posted, a contributor's ID, the type of posted message (a question message or an answer message), in the case where the posted message is a question message, a location (hereinafter, referred to as question location) on a map, arbitrarily specified by a user, or a questioner, and the like. Positional information of the location (question location) on the map, arbitrarily specified by the user, or the questioner, is defined as positional information associated with the question message (hereinafter, referred to as question positional information). Here, FIG. 3 shows an example of posted messages that are collected and provided by the posted message information management server 4. As shown in FIG. 3, each posted message includes posted time, the type of posted message, a question location, a user ID, the sentence of the posted message, and the like. In addition, an answer message and a question message, to which the answer message is made, are stored in association with each other. In the posted message information management server 4, pieces of information about posted messages posted from nationwide users are cumulatively stored in the posted message information DB 8, and, when the amount of data stored becomes larger than or equal to a predetermined amount, pieces of information about past posted messages are sequentially deleted. In addition, the posted message information management server 4 may be installed in a center different from the posted message management center 2.

On the other hand, each communication terminal 6 is an information communication terminal that has the function of identifying a current location of the communication terminal 6, such as a GPS, (that is, a current location of the user 5) and the function of showing a map image around the current location of the user 5. For example, a navigation system, a cellular phone, a PDA, a smartphone, or the like, applies to each communication terminal 6.

In addition, each communication terminal 6 is connected to the communication network 7 via a transmission and reception circuit portion (RF) 33 (described later), and is configured so as to be bidirectionally communicable with the posted message management center 2. Then, when information about a posted message (including a question message or an answer message) has been received from the posted message management center 2, the communication terminal 6 shows the sentence of the posted message received (described later) on the display of the communication terminal 6, and allows the user to access the contents of the posted message (see FIG. 11). However, particularly, restriction on access to an answer message is applied under a specific condition as will be described later. The details of each communication terminal 6 will be described later.

The communication network 7 includes a large number of base stations respectively arranged at nationwide locations and a communication company that manages and controls the base stations, and is formed by connecting the base stations and the communication company to each other by wired (optical fibers, ISDN, or the like) or wireless connection. Here, each base station includes a transceiver (transmitter-receiver) and an antenna that communicate with each communication terminal 6. Then, each base station wirelessly communicates with the communication company, while each base station serves as a terminal of the communication network 7 and functions to relay communication of each communication terminal 6 within a range (cell) in which radio waves of the base station reach to the posted message management center 2.

Subsequently, the configuration of the posted message searching server. 3 that constitutes the information sharing system 1 will be described in more details with reference to FIG. 2. As shown in FIG. 2, the posted message searching server 3 is basically formed of an information management ECU 11, a map information. DB 12 that serves as information recording means connected to the information management ECU 11, and a center communication device 13.

As shown in FIG. 2, the information management ECU 11 is an electronic control unit that executes various controls in the posted message searching server 3. The information management ECU 11 includes a CPU 21 that serves as a processing unit and a control unit, and an internal storage unit, such as a RAM 22 that is used as a working memory at the time when the CPU 21 executes various arithmetic processings and a ROM 23 that stores not only various control programs but also a question message posting process program (FIG. 5) (described later), an answer message posting process program (FIG. 12) (described later), and the like. The information management ECU 11 constitutes various means as processing algorithms together with the ECU of each communication terminal 6. For example, question message information acquisition means acquires a question message input via a terminal, such as the communication terminal 6, together with positional information associated with the question message. Question message releasing means allows the user to access the acquired question message on the computer network. Answer message information acquisition means acquires an answer message input via the terminal as an answer to the question message. Answer message releasing means allows the user to access the acquired answer message on the computer network. Respondent positional information acquisition means acquires positional information of a respondent that is the user who inputs an answer message. Access restriction means restricts a questioner that is the user who posted the question message from accessing the answer message on the basis of question positional information that is the positional information associated with the question message and respondent positional information that is the positional information of the respondent, acquired by the respondent positional information acquisition means. Restriction determination means determines whether restriction on access is applied by the access restriction means on the basis of the contents of the question message. Content determination means determines whether an answer target question message is a question that requires an answer in real time on the basis of the contents of the question message. Correspondence relationship information acquisition means acquires correspondence relationship information that associates whether it is a question that requires an answer in real time with each of multiple-type fixed messages.

The map information DB 12 is storage means in which map information is stored. Here, the map information stored in the map information DB 12 includes various pieces of information required for route search and map display, including a road network, and is, for example, formed of link data about roads (links), node data about nodes, route data about routes of public transportation, such as trains and buses, facility data about facilities, intersection data about intersections, search data for searching for a route, retrieval data for retrieving a location, map display data for displaying a map, and the like. The map information DB 12 is periodically updated to new map information.

The center communication device 13 is a communication device for communicating with each communication terminal 6 via the communication network 7. In the first embodiment, a request to access a posted message and information about a posted message are exchanged with the posted message searching server 3 or the communication terminal 6 via the center communication device 13.

Next, the schematic configuration of each communication terminal 6 owned by the user 5 will be described with reference to FIG. 4. FIG. 4 is a block diagram that schematically shows a control system of the communication terminal 6 according to the first embodiment.

As shown in FIG. 4, the communication terminal 6 is formed by connecting a CPU 31, a memory 32 that stores user information (user ID, name, and the like) about the user 5 who owns the communication terminal 6, map information, and the like, the transmission and reception circuit portion (RF) 33 that exchanges signals with the base stations of the communication network 7, a base band processing unit 34 that converts a radio frequency (RF) signal received by the transmission and reception circuit portion 33 to a base band signal and that converts a base band signal to an RF signal, an input/output unit 37 that is an interface connected to a microphone 35, a speaker 36, and the like, a display 38 formed of a liquid crystal display panel, or the like, an input operation unit 39 formed of a touch panel, a keyboard, or the like, and a GPS 40 to a data bus BUS.

Here, the CPU 31 incorporated in the communication terminal 6 is control means of the communication terminal 6, which executes various operations in accordance with operation programs stored in the memory 32, and constitutes a communication terminal ECU 41 together with the memory 32. Various processing details of the communication terminal ECU 41 are displayed on the display 38 where necessary.

The memory 32 is a storage medium that stores, in addition to the user information (user ID, name, and the like) about the user 5 who owns the communication terminal 6 and map information, an application program, such as an installed navigation application, a fixed message DB, a history of the current location of the user 5, the question message posting process program (FIG. 5) (described later), the answer message posting process program (FIG. 12) (described later), and the like.

Here, the map information stored in the memory 32 is, for example, formed of link data about roads (links), node data about nodes, route data about routes of public transportation, such as trains and buses, facility data about facilities, map display data for displaying a map, intersection data about intersections, search data for searching for a route, retrieval data for retrieving a location, and the like. The map information may be not stored in the memory 32 but may be acquired from the server through communication. In addition, the memory 32 may be formed of a hard disk, a memory card or an optical disk, such as a CD and a DVD.

The fixed message DB that is stored in the memory 32 is a DB in which multiple-type fixed messages having a high usage frequency as question messages and answer messages are recorded. In addition, among fixed messages that are stored in the fixed message DB, particularly, the fixed messages that are used as question messages are associated with information for identifying whether it is a question that requires an answer in real time (see FIG. 20). Then, the communication terminal ECU 41 determines whether a question message input to the communication terminal 6 using the fixed message DB as will be described later is a question that requires an answer in real time. In addition, at the time when the user inputs a question message or an answer message through the communication terminal 6, among the fixed messages stored in the fixed message DB, adequate fixed messages are displayed as input candidates (see FIG. 7 and FIG. 15).

The display 38 is arranged on one face of a casing, and a liquid crystal display, an organic EL display, or the like, is used as the display 38. Then, a top screen for executing various applications that are installed in the communication terminal 6, screens (an internet screen, a mail screen, a navigation screen, and the like) regarding executed applications, and various pieces of information, such as images and moving images, are displayed. Particularly, in the navigation screen that is displayed in the case where a navigation application is executed, a map image that includes roads, traffic information, a guide route from a departure place to a destination, guide information along the guide route, and the like, are also displayed. Furthermore, in the first embodiment, information about a posted message received from the posted message management center 2 (the sentence of the posted message, contributor's ID, a question location, and the like) are also shown.

The input operation unit 39 is formed of a touch panel provided on the front face of the display 38. Then, the communication terminal ECU 41 executes control to carry out various corresponding operations on the basis of an electric signal that is output through, for example, depression of the touch panel. Particularly, in the first embodiment, the input operation unit 39 is used, for example, at the time of posting a message, such as a question message and an answer message, at the time when a posted message that has been already posted on the computer network is accessed, or the like. The input operation unit 39 may be formed of various keys, and the like, such as number/character input keys, cursor keys that move a cursor for selecting displayed contents and a select key for fixing a selection.

The GPS 40 is able to detect the current location and current time of the communication terminal 6 (that is, the user 5) by receiving radio waves emitted from artificial satellites. In addition, another device (for example, a gyro sensor, or the like) for detecting the current location and direction of the communication terminal 6 may be included in addition to the GPS 40.

The transmission and reception circuit portion 33 is configured to be communicable with a traffic information center, for example, a VICS (registered trademark) center, a probe center, or the like, via the communication network 7 other than the posted message management center 2. Then, it is possible to acquire traffic information, such as traffic congestion information, regulatory information and traffic accident information, via the VICS center or the probe center.

Figure 5:
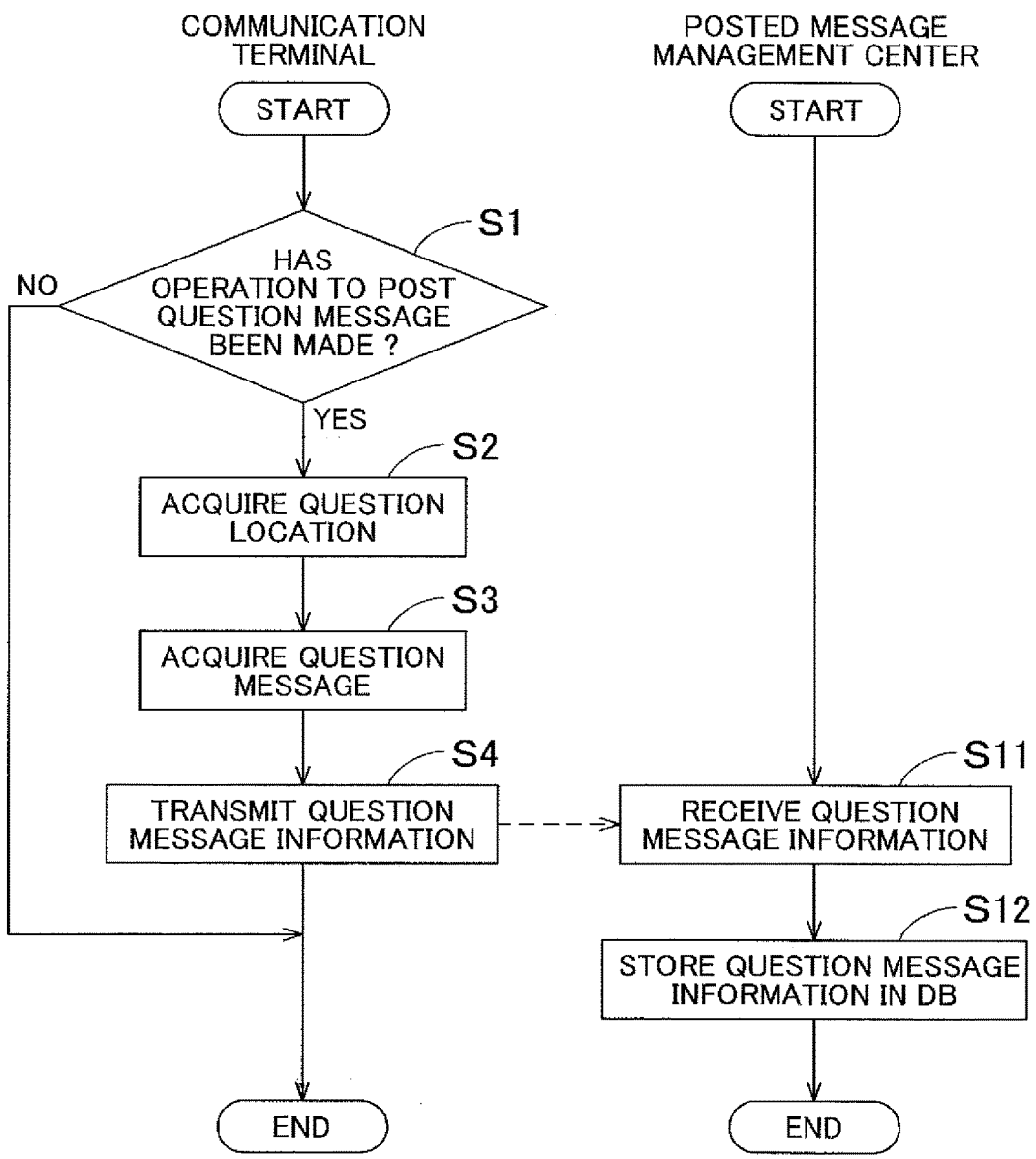
FIG. 5 is a flowchart of a question message posting process program according to the first embodiment.

Subsequently, the question message posting process program that is executed in the communication terminal 6 and the posted message management center 2 that constitute the above-configured information sharing system 1 will be described with reference to FIG. 5. FIG. 5 is a flowchart of the question message posting process program according to the first embodiment. Here, the question message posting process program is executed after the power of the communication terminal 6 is turned on (particularly, when the communication terminal 6 is an in-vehicle device, ACC of the host vehicle is turned on), and is a program that, at the time when the user has posted particularly a question message as a posted message on the computer network, manages and stores the posted question message. The following programs shown by flowcharts in FIG. 5, FIG. 12, FIG. 18, FIG. 19, FIG. 22, FIG. 25, FIG. 27 and FIG. 29 are stored in the RAM, the ROM, or the like, included in the posted message management center 2 or the communication terminal 6, and are executed by the CPU 21 or the CPU 31. The question message posting process program may be executed after the question message posting process program or an application that includes the question message posting process program is started up in the case where question message posting process program is started up from a mobile terminal (for example, a smartphone, a cellular phone or a tablet terminal).

First, the question message posting process program that is executed in the communication terminal 6 will be described. In step (hereinafter, abbreviated as "S") 1, the CPU 31 determines whether operation to post a question message has been made on the basis of operation of a user 5 (user who owns the terminal and is a questioner who posts a question message, and the same applies to the following description), which is accepted by the input operation unit 39.

Figure 6:
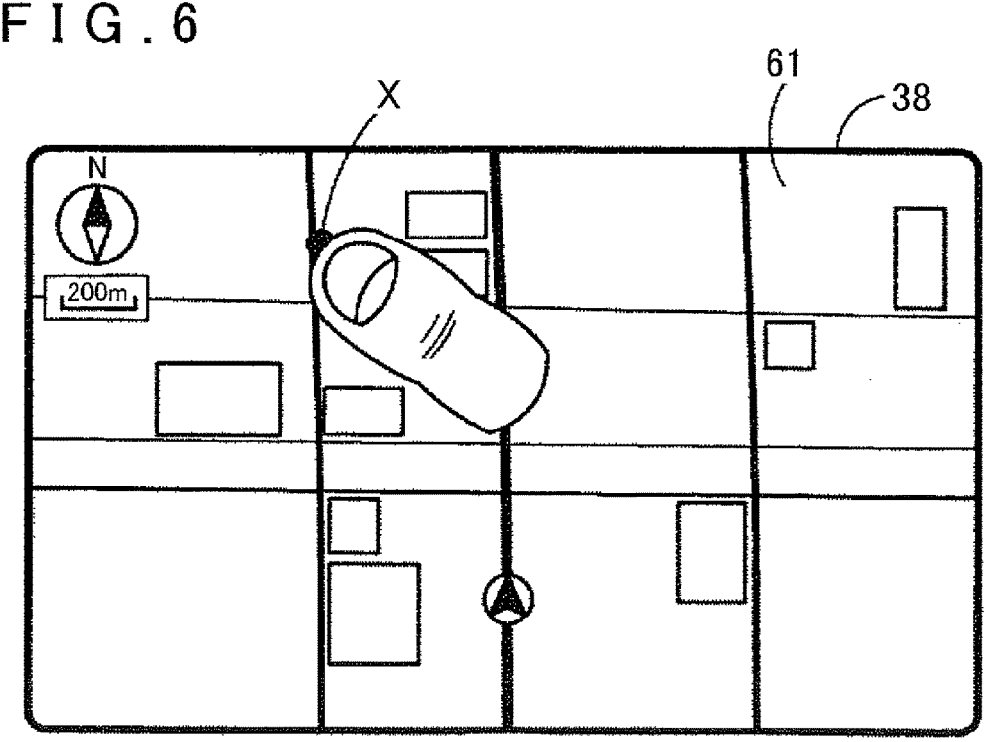
FIG. 6 is a view that illustrates user's operation to post a question message.

Here, FIG. 6 to FIG. 9 are views that illustrate user's operation to post a question message in the communication terminal 6. As shown in FIG. 6, the user initially selects an arbitrary location on a map image 61 displayed on the display 38 as a question location X. The question location X selected by the user is a location that is a question target of the question message to be posted, and, as will be described later, basically, the question message to be posted is a question about the question location X (for example, the traffic congestion, weather condition, and the like; at the question location X). In addition, information about the question location X is associated with the question message and is transmitted to the posted message management center 2 as will be described later, and is stored in the posted message information DB 8 together with the question message (see FIG. 3).

Figure 7:
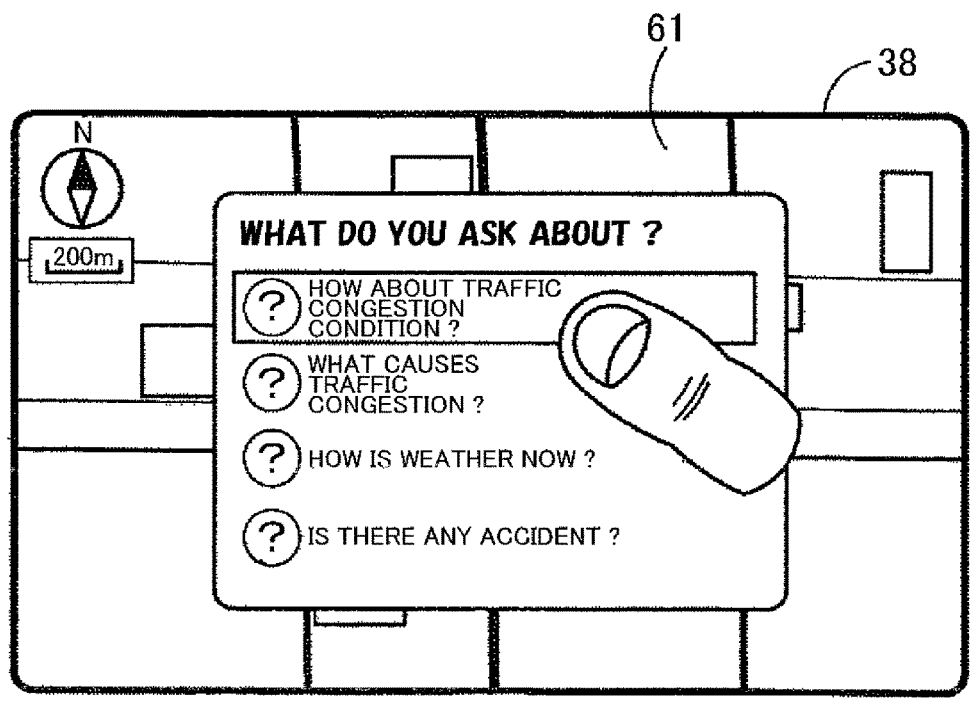
FIG. 7 is a view that illustrates user's operation to post the question message.
Figure 8:
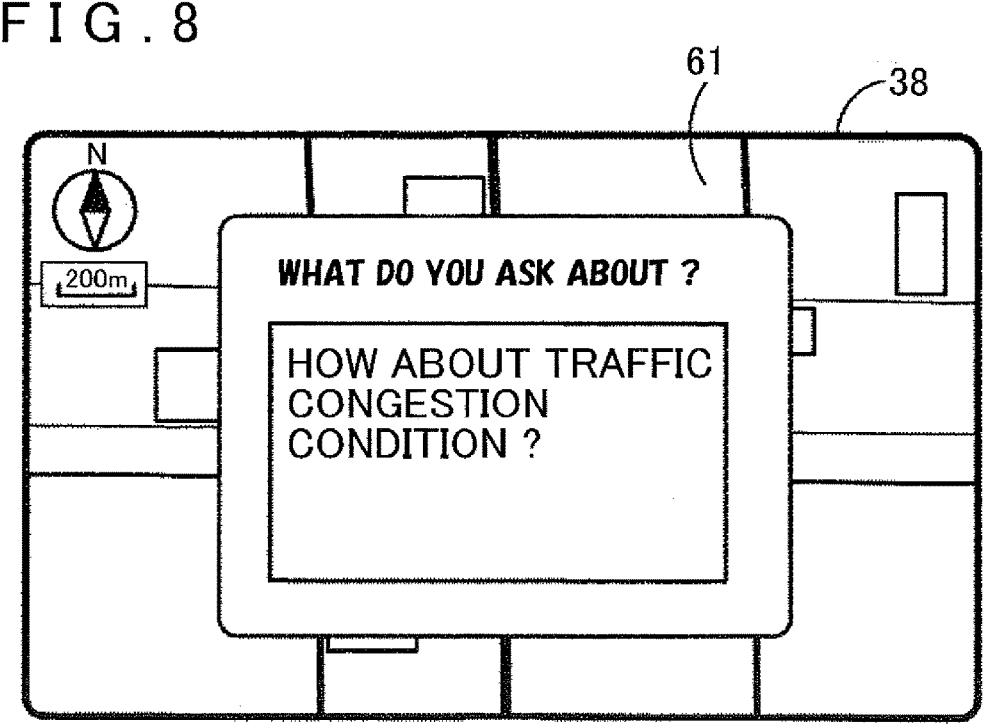
FIG. 8 is a view that illustrates user's operation to post the question message.

Subsequently, as shown in FIG. 7, the user selects the sentence for the question message from among a plurality of fixed messages displayed on the display 38. The sentence of the question message may be an arbitrary sentence input by the user as shown in FIG. 8 instead of being selected from among fixed messages. In addition, the sentences of fixed messages to be displayed may be changed on the basis of the question location. For example, when a location on a road is selected as the question location, questions about traffic congestion and an accident are displayed as fixed messages; when a location on a railway is selected as the question location, questions about a service condition of an electric train are displayed as fixed messages; and when a location on a facility is selected as the question location, questions about a crowded condition and operating condition of the facility are displayed as fixed messages. Fixed messages to be displayed are stored in the fixed message DB of the memory 32 in advance.

Figure 9:
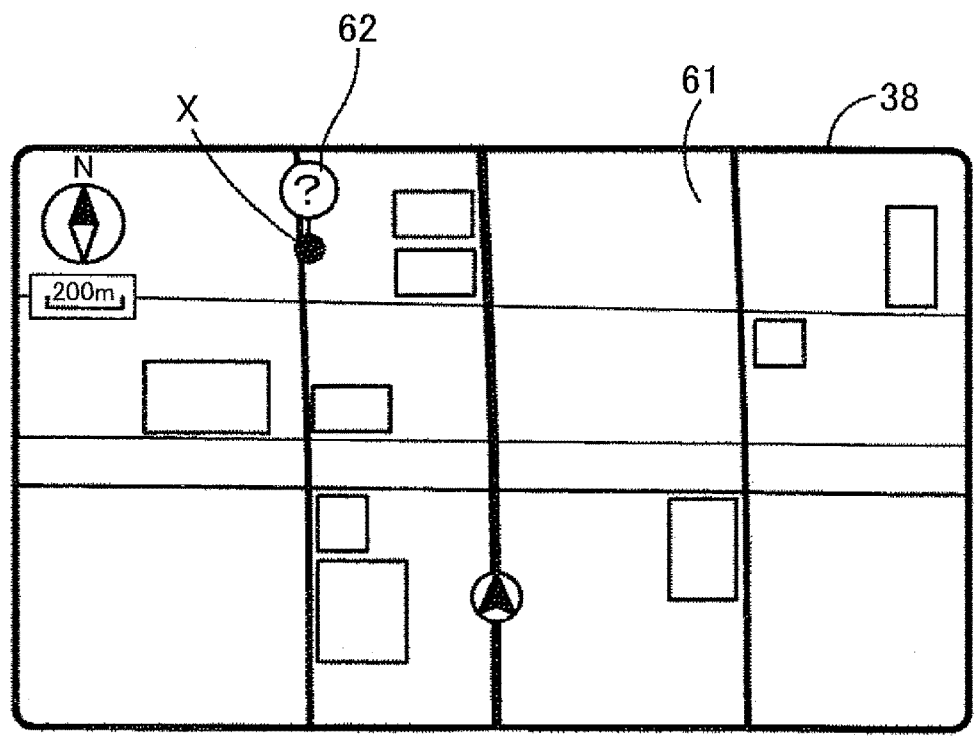
FIG. 9 is a view that illustrates user's operation to post the question message.

When a question message is input, the input question message is transmitted to the posted message management center 2 together with a question location as will be described later. After that, as shown in FIG. 9, a question icon 62 that indicates that there is the posted question message is newly displayed at the question location X of the posted question message.

Figure 10:
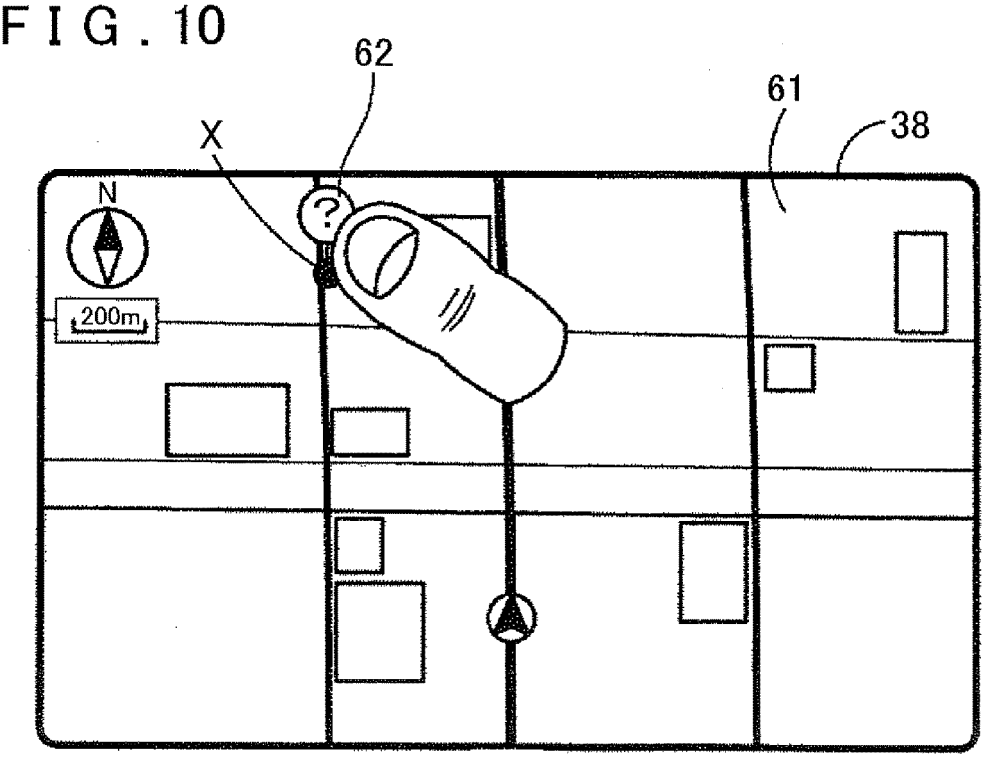
FIG. 10 is a view that illustrates user's operation to access the question message.
Figure 11:
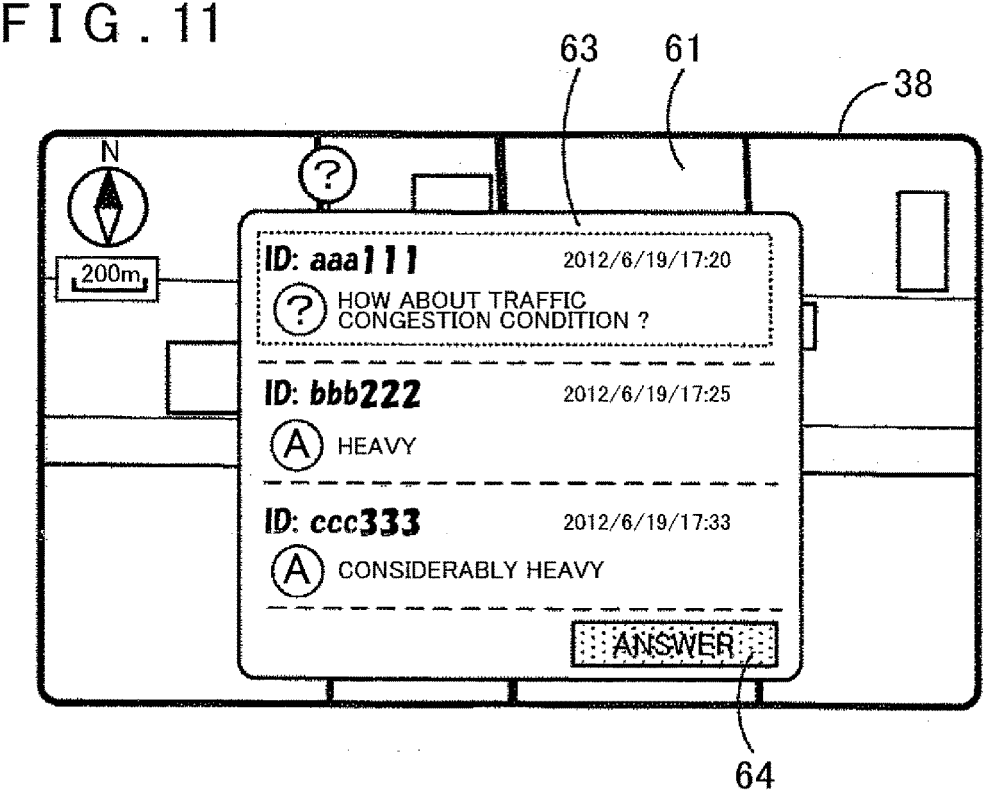
FIG. 11 is a view that illustrates user's operation to access the question message.

After that, as shown in FIG. 10, when the user selects the question icon 62 on the map image 61 displayed on the display 38, the question message associated with the question location X at which the question icon 62 is displayed is newly displayed on a window 63 as shown in FIG. 11. Furthermore, when there are already answers to the question message associated with the question location X, the answer messages that have been answered till present time are also displayed together. As a result, the user is able to access the question message posted as a question about the location by himself or another user and the answer messages to the question message by selecting the question icon 62 displayed on the map image 61. In addition, by selecting an answer button 64 displayed on the window 63, it is possible to post an answer message as an answer to the displayed question message. However, particularly, restriction on access to an answer message is applied under a specific condition as will be described later.

As a result of determination of S1, when it is determined that operation to post a question message has been made by the input operation unit 39 (YES in S1), the process proceeds to S2. In contrast to this, when operation to post a question message has not been made by the input operation unit 39 (NO in S1), the question message posting process program is ended.

In S2, the CPU 31 acquires positional information associated with the question message (question positional information) as a question location on the basis of user's operation input via the input operation unit 39. The question location is a location that is a question target of a question message to be posted, and is selected by the user on the map image displayed on the display 38 as described above (see FIG. 6).

In S3, the CPU 31 acquires the sentence of the question message on the basis of user's operation input via the input operation unit 39. The sentence of the question message is selected by the user from the fixed messages displayed on the display 38 as described above, or is an arbitrary sentence input by the user (see FIG. 7 and FIG. 8).

Subsequently, in S4, the CPU 31 transmits the posted time, at which the question message was posted, the contributor's ID and the type of posted message (that is, the question message) together with the question location acquired in S2 and the sentence of the question message, acquired in S3, to the posted message management center 2 as question message information.

Next, the question message posting process program that is executed in the posted message management center 2 will be described. Initially, in S11, the CPU 21 receives question message information transmitted from the communication terminal 6.

Subsequently, in S12, the CPU 21 stores the question message information, received in S11, in the posted message information DB 8 (FIG. 3). The question message information stored in the posted message information DB 8 is configured to be accessible from the communication terminal 6 from which the access request has been issued.

Figure 12:
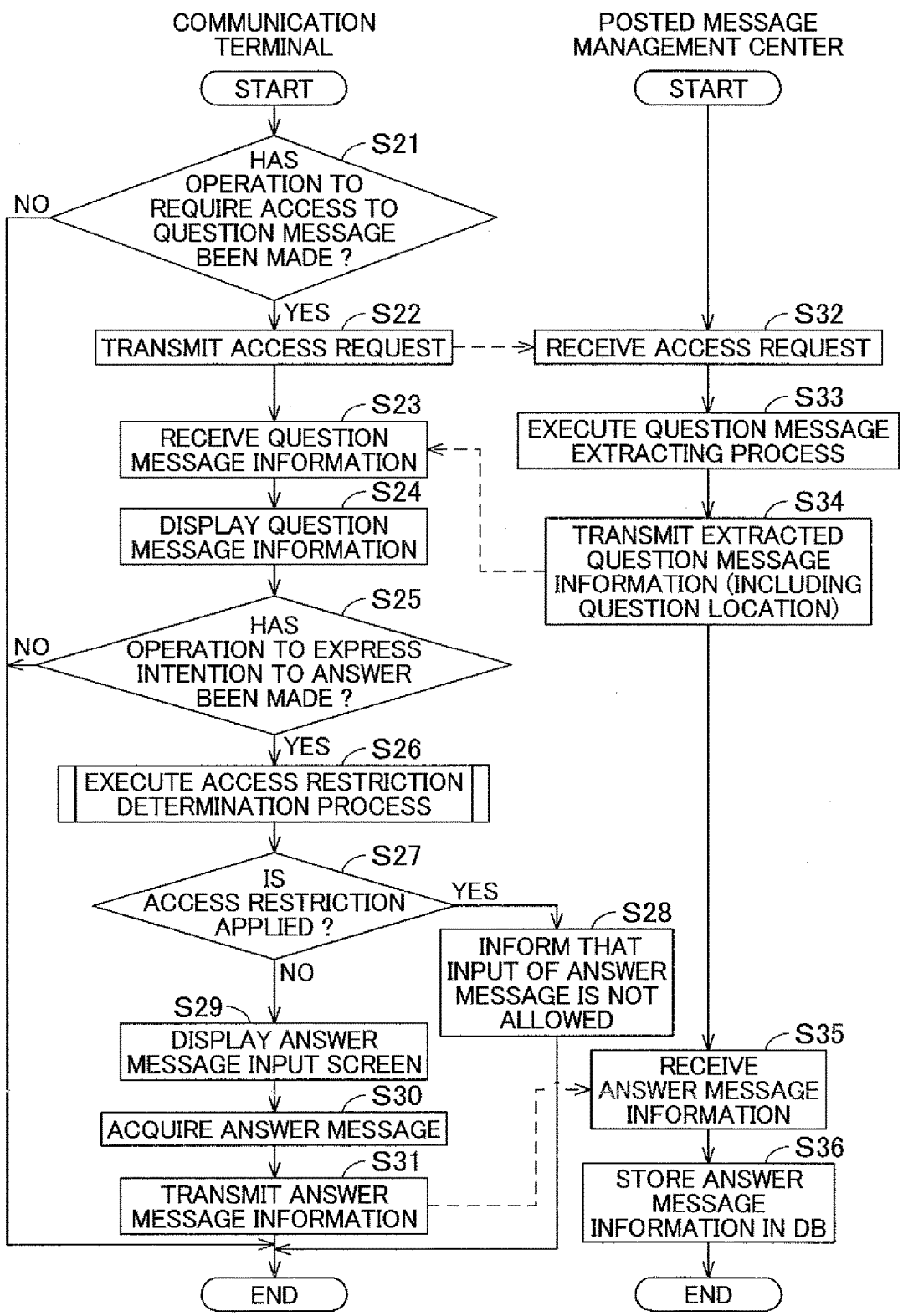
FIG. 12 is a flowchart of an answer message posting process program according to the first embodiment.

Subsequently, the answer message posting process program that is executed in the communication terminal 6 and the posted message management center 2 will be described with reference to FIG. 12. FIG. 12 is a flowchart of the answer message posting process program according to the first embodiment. Here, the answer message posting process program is executed after the power of the communication terminal 6 is turned on (particularly, when the communication terminal 6 is an in-vehicle device, ACC of the host vehicle is turned on), and is a program that causes the user 5 who answers the question message to access the question message, and that, at the time when the user 5 has posted an answer message to the accessed question message on the computer network, manages and stores the posted answer message. The answer message posting process program may be executed after the answer message posting process program or an application that includes the answer message posting process program has been started up in the case where the answer message posting process program is started up from a mobile terminal (for example, a smartphone, a cellular phone or a tablet terminal).

First, the answer message posting process program that is executed in the communication terminal 6 will be described. In S21, the CPU 31 determines whether operation to require access to a question message has been made on the basis of user's operation (the user owns the terminal and is a respondent who posts an answer message, and the same applies to the following description) accepted by the input operation unit 39.

Specifically, as shown in FIG. 10, when the user has selected the question icon 62 (that is, the question location) on the map image 61 displayed on the display 38, it is determined that operation to require access to the question message has been made. It may be determined that operation to require access to the question message has been made when a retrieval condition for retrieving the question message has been input. The retrieval condition may be a condition that specifies a retrieval word included in the question message (for example, "OX Street", "Traffic Congestion", or the like), time at which the question message was posted or a question location. For example, when a condition that the question location is OO City is input, it is possible to retrieve a question message that has a question location within OO City.

Then, as a result of determination in S21, when it is determined that operation to require access to the question message has been made by the input operation unit 39 (YES in S21), the process proceeds to S22. In contrast to this, when it is determined that operation to require access to the question message has not been made by the input operation unit 39 (NO in S21), the answer message posting process program is ended.

In S22, the CPU 31 transmits a request to access the question message based on user's operation to the posted message management center 2. Specifically, when the question icon 62 (see FIG. 10) has been selected on the map image 61, an access request to require access to the question message corresponding to the selected question icon 62 is transmitted; whereas, when a retrieval condition has been input, an access request to require access to a question message corresponding to the retrieval condition is transmitted. The posted message management center 2, upon reception of the access request to a question message, extracts the question message corresponding to the access request (for example, when the question icon 62 has been selected on the map image 61 as shown in FIG. 10, the question message associated with the selected question icon 62) from among posted messages posted on the computer network on the basis of the received access request (S32) as will be described later. When an answer message has been already posted for the question message corresponding to the access request, the answer message is also extracted.

Subsequently, in S23, the CPU 31 receives information about the question message transmitted from the posted message management center 2. The information about the question message, received in S23, is information about the question message extracted from among the question messages posted on the computer network on the basis of the access request transmitted in S22. In addition, information about a posted message includes, in addition to the sentence of the posted message, posted time at which the posted message was posted, the type of posted message (that is, the question message), a question location, contributor's ID, and the like. When information about the answer message has also been transmitted from the posted message management center 2, the information about the answer message is also received.

Subsequently, in S24, the CPU 31 displays the information about the question message, received in S23, on the display 38 (see FIG. 11). Specifically, the sentence of the question message, the posted time at which the question message was posted and the contributor's ID are displayed. In addition, voice that reads the question message may be output from the speaker 36. The posted time and the contributor's ID may be configured not to be displayed. Furthermore, when there has been already an answer to the question message received in S23, the answer message that has been answered till present time is also displayed.

Figure 13:
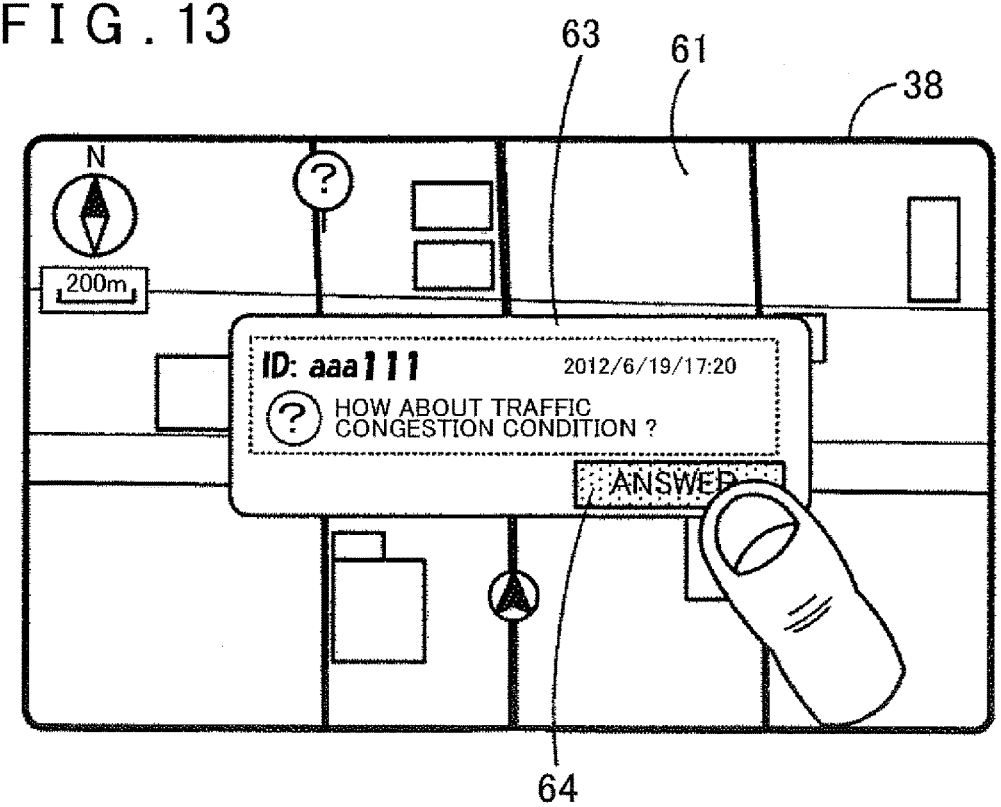
FIG. 13 is a view that illustrates user's operation to post an answer message.

After that, in S25, the CPU 31 determines whether operation that the user expresses an intention to answer the question message displayed on the display 38 in S24 has been made on the basis of user's operation accepted by the input operation unit 39. Specifically, as shown in FIG. 13, when the user has selected the answer button 64 displayed together with the question message on the window 63 of the display 38, it is determined that operation that the user expresses an intention to answer the displayed question message has been made.

Then, when it is determined that operation that the user expresses an intention to answer the displayed question message has been made (YES in S25), the process proceeds to S26. In contrast to this, when it is determined that operation that the user expresses an intention to answer the displayed question message has not been made (NO in S25), the answer message posting process program is ended.

Figure 18:
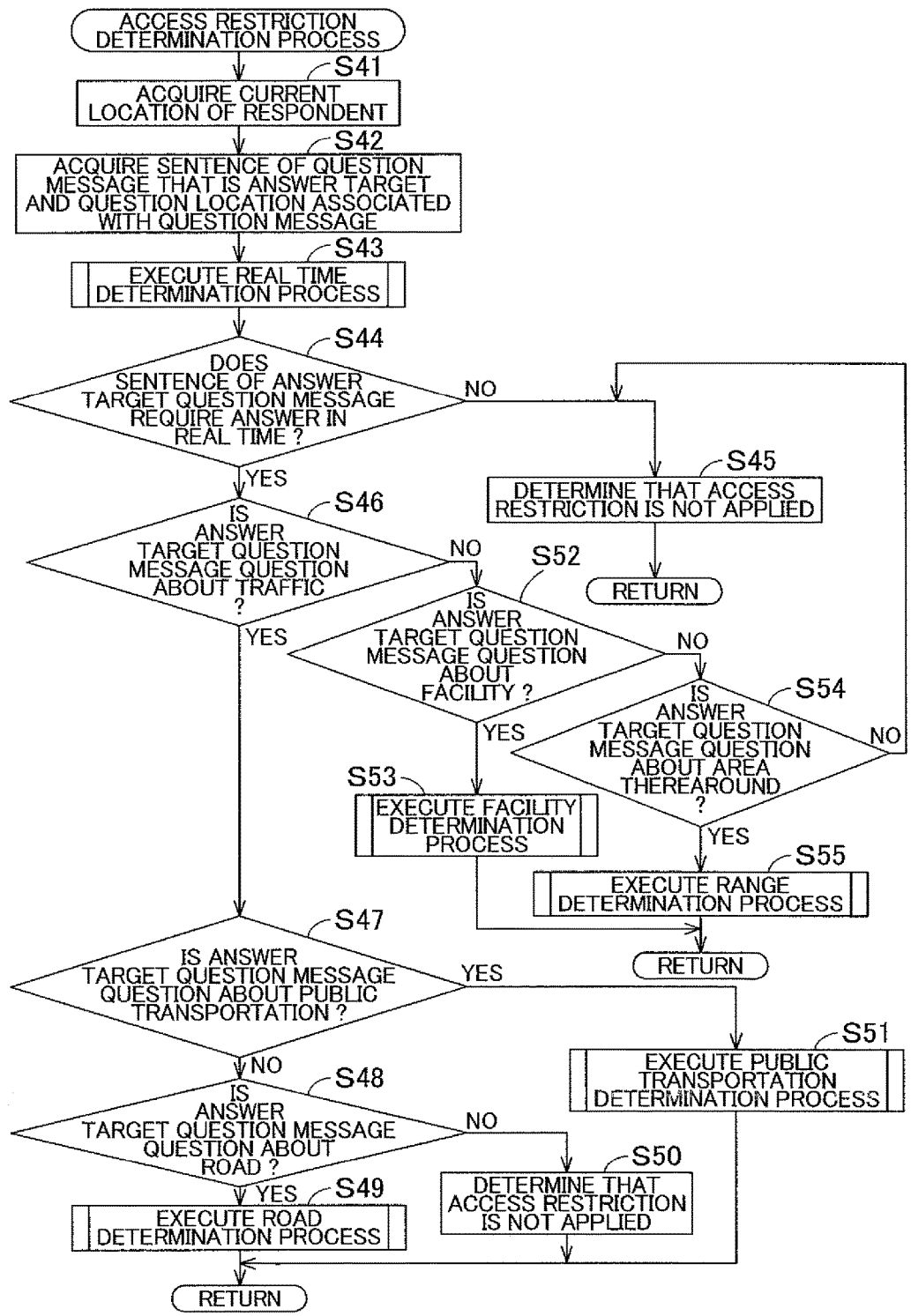
FIG. 18 is a flowchart of a sub-process program of an access restriction determination process according to the first embodiment.

In S26, the CPU 31 executes access restriction determination process (described later) (FIG. 18). Here, the access restriction determination process is a process of determining whether restriction on access to an answer message to be answered by the user to the question message is applied on the basis of the question location associated with the question message acquired in S23, that is, positional information (question positional information) and the question contents, associated with the question message, information about the current location of the user who owns the terminal (that is, the respondent) (hereinafter, referred to as respondent positional information), and the like.

After that, in S27, the CPU 31 determines whether the determination result of the access restriction determination process in S26 is the result that "restriction on access to an answer message to be answered by the user is applied".

Then, when the determination result of the access restriction determination process in S26 is the determination result that "restriction on access to an answer message to be answered by the user is applied" (YES in S27), the process proceeds to S28 without displaying a screen for inputting an answer message.

Figure 14:
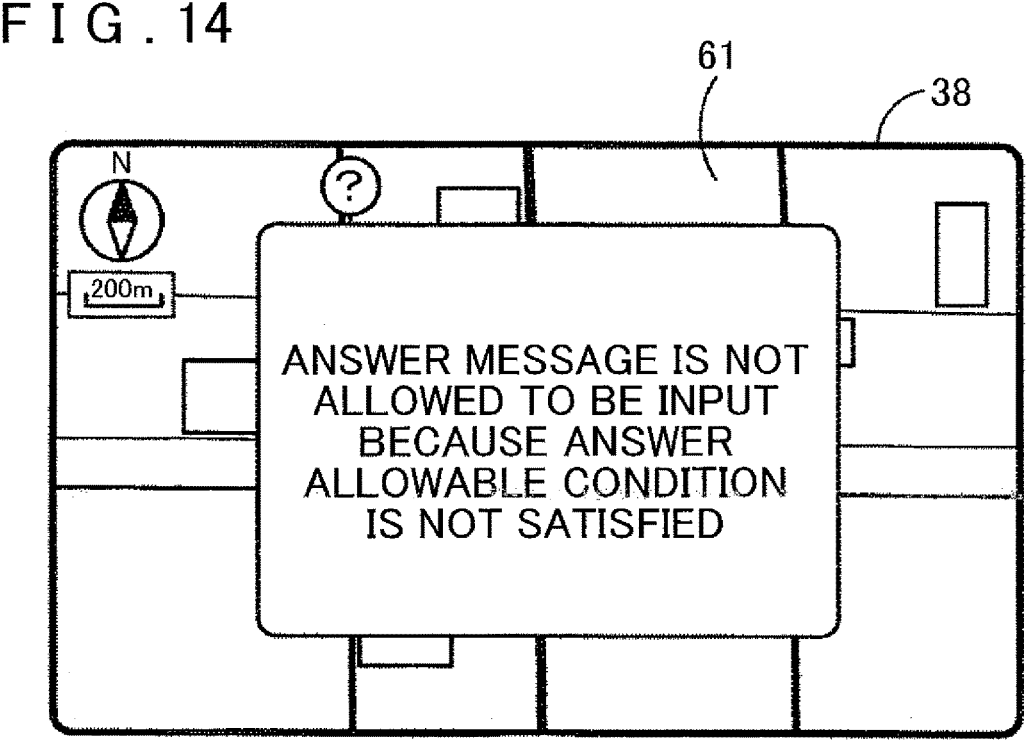
FIG. 14 is a view that shows a display screen that is displayed on a display in the case where input of the answer message is restricted.

In S28, the CPU 31 informs that an answer message is not allowed to be input because the user does not satisfy a condition for allowing access to an answer message to be posted as shown in FIG. 14. Then, the answer message posting process program is ended without allowing input of an answer message. As a result, the user who posted the question message and a third-person user are restricted from accessing the answer message.

On the other hand, when the determination result of the access restriction determination process in S26 is the determination result that "restriction on access to an answer message to be answered by the user is not applied" (NO in S27), the process proceeds to S29.

In S29, the CPU 31 displays an answer message input screen for inputting an answer message on the display 38. The answer message input screen is a screen for allowing the user to input an answer message.

Figure 15:
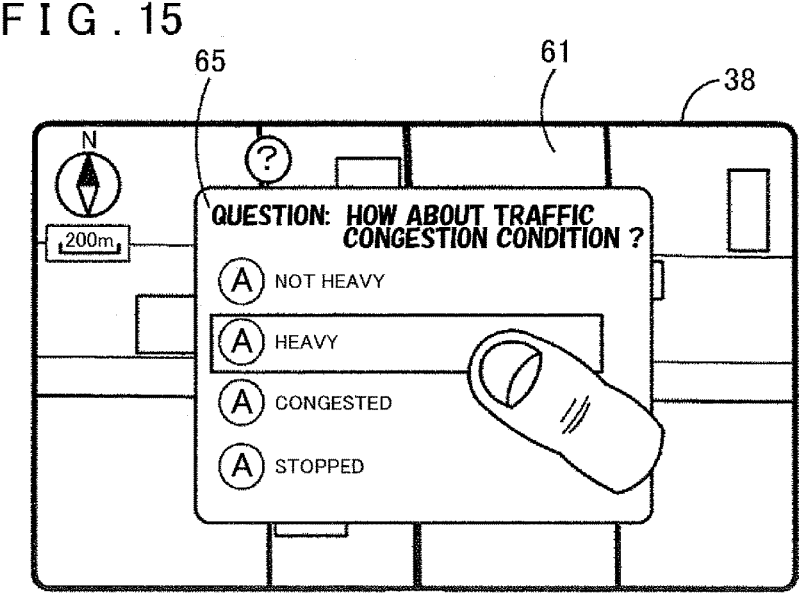
FIG. 15 is a view that illustrates user's operation to post the answer message.
Figure 16:
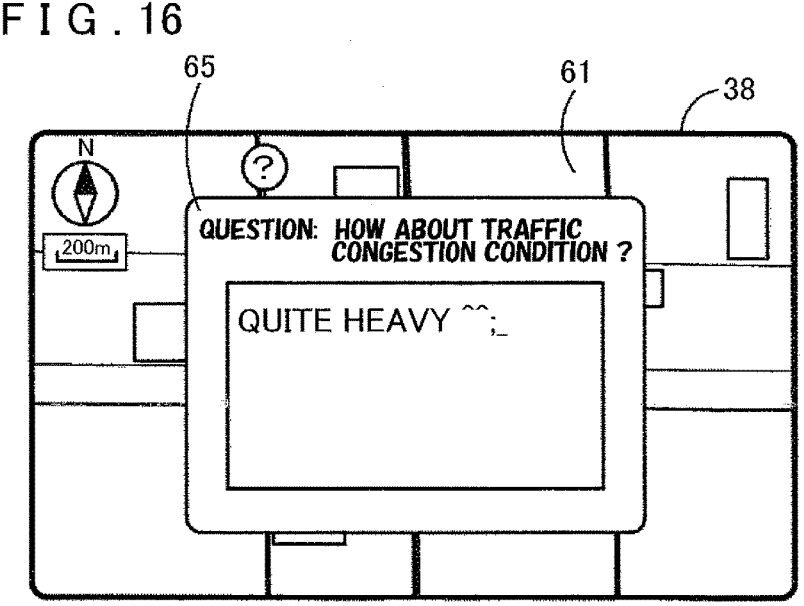
FIG. 16 is a view that illustrates user's operation to post the answer message.

Here, FIG. 15 and FIG. 16 are views that illustrate user's operation to post an answer message in the communication terminal 6. When the answer button 64 (see FIG. 13) displayed together with the question message has been selected, and when the determination result of the access restriction determination process in S26 is the determination result that "restriction on access to an answer message to be answered by the user is not applied", the answer message input screen 65 shown in FIG. 15 is displayed. Here, a plurality of fixed messages that are answer candidates are displayed on the answer message input screen 65. Then, the user inputs an answer message by selecting the sentence to be set for the answer message from among the plurality of fixed messages displayed on the display 38. Input of an answer message may be configured by allowing the user to input an arbitrary sentence as shown in FIG. 16 instead of selecting from among fixed messages. In addition, the sentences of the fixed messages that are displayed on the answer message input screen 65 are desirably changed in accordance with the contents of an answer target question message. For example, when an answer is made to a question message for asking a traffic congestion condition, answers that indicate the levels of traffic congestion are displayed as fixed messages; when an answer is made to a question message for asking the service situation of an electric train, answers that indicate whether the service of the electric train is smooth are displayed as fixed messages; and, when an answer is made to a question message for asking the crowded condition of a facility, answers that indicate the levels of crowdedness of the facility are displayed as fixed messages. Fixed messages to be displayed are stored in the fixed message DB of the memory 32 in advance; instead, the fixed message DB may be provided in a server and then fixed messages may be acquired from the server.

Figure 17:
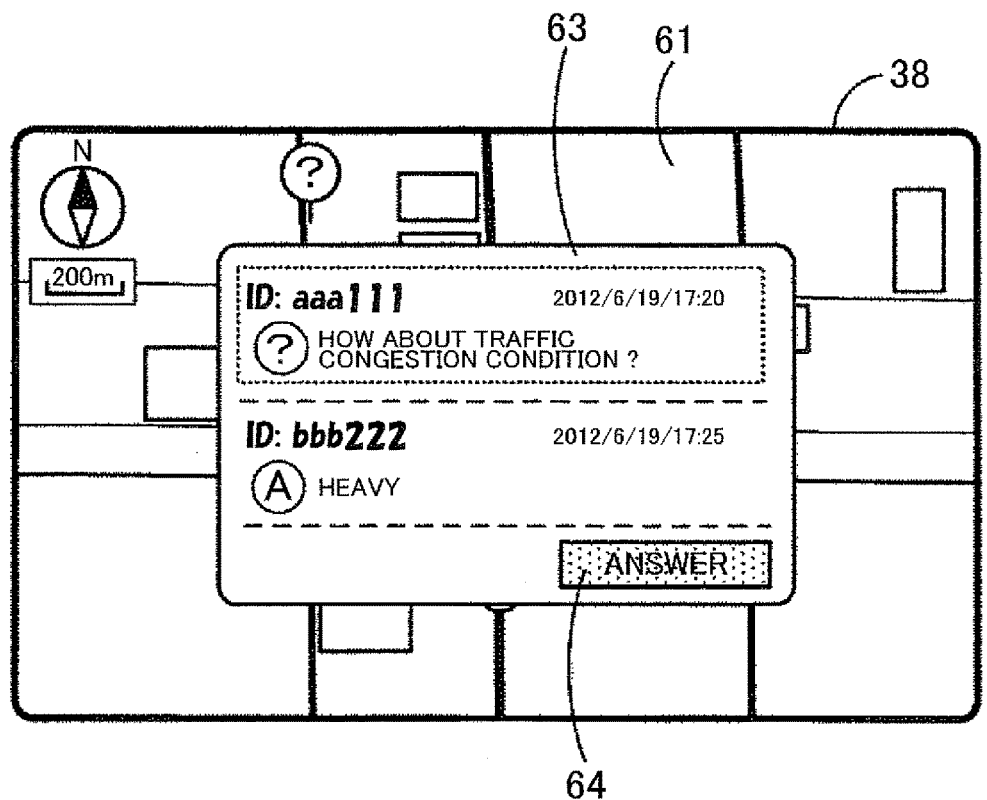
FIG. 17 is a view that shows an example of the displayed answer message posted by the user.

When an answer message has been input through the answer message input screen 65, the input answer message is transmitted to the posted message management center 2 as will be described later. After that, when the user selects the question icon 62 on the map image 61 displayed on the display 38, a newly answered answer message is displayed together with the question message as shown in FIG. 17. However, under a specific condition, restriction on access to the posted answer message may be applied.

Subsequently, in S30, the CPU 31 acquires the sentence of the answer message on the basis of user's operation input via the input operation unit 39. The sentence of the answer message is selected by the user from fixed messages displayed on the display 38 as described above or an arbitrary sentence input by the user (see FIG. 15 and FIG. 16).

Subsequently, in S31, the CPU 31 transmits the posted time at which the answer message was posted, the contributor's ID and the type of posted message (that is, the answer message) together with the sentence of the answer message acquired in S30 to the posted message management center 2 as answer message information.

Next, the answer message posting process program that is executed in the posted message management center 2 will be described. Initially, in S32, the CPU 21 receives the request to access the question message, transmitted from the communication terminal 6.

Subsequently, in S33, the CPU 21 executes retrieval process of retrieving a question message corresponding to the access request from among the posted messages posted on the computer network on the basis of the access request to the question message, received in S32. Specifically, information about the question message corresponding to the access request is extracted from the posted message information (FIG. 3) stored in the posted message information DB 8. Information about a question message to be extracted also includes information about the question location of the question message.

After that, in S34, the CPU 21 transmits information about the question message extracted in S33 (including the question location) to the communication terminal 6 that has issued the request to access the question message. As a result, through the communication terminal 6 that has issued the request to access the question message, the information about the question message intended by the user is output (S24).

In S35, the CPU 21 receives the answer message information transmitted from the communication terminal 6.

Subsequently, in S36, the CPU 21 stores the answer message information, received in S35, in the posted message information DB 8 (FIG. 3). The answer message information stored in the posted message information DB 8 is configured to be accessible from the communication terminal 6. However, under a specific condition, restriction on access to the answer message may be applied.

Next, the sub-process of the access restriction determination process that is executed in S26 will be described with reference to FIG. 18. FIG. 18 is a flowchart of the sub-process program of the access restriction determination process.

Initially, in S41, the CPU 31 acquires information about the current location of the communication terminal 6 (that is, the user 5) (respondent positional information) with the use of the GPS 40, or the like, mounted on the communication terminal 6. The current location of the user 5, which is acquired in S41, is the current location of the respondent who answers the question message (more specifically, the location of the respondent at the time point at which an answer message is posted).

Subsequently, in S42, the CPU 31 acquires the contents of the answer target question message (question message received from the posted message management center 2 in S23; hereinafter, referred to as answer target question message) and the question location associated with the answer target question message (question positional information).

Subsequently, in S43, the CPU 31 executes real time determination process (FIG. 19) (described later). The real time determination process is a process of determining whether the answer target question message is a question that requires an answer in real time on the basis of the contents of the answer target question message, acquired in S42. The question that requires an answer in real time is a question to which an answer may change with a lapse of time even with the same question, and, for example, a question, or the like, for specifying the state of an incident (for example, a present weather condition, a present traffic congestion condition) at the present time or within a set period of time from the present time for an incident that fluctuates with time applies to this question.

After that, in S44, the CPU 31 determines whether the determination result of the real time determination process in S43 is the result that "the answer target question message is a question that requires an answer in real time".

When the determination result of the real time determination process in S44 is the determination result that "the answer target question message is a question that requires an answer in real time" (YES in S44), the process proceeds to S46. In contrast to this, when the determination result of the real time determination process in S44 is the determination result that "the answer target question message is not a question that requires an answer in real time" (NO in S44), it is recognized that the user (respondent) can have a correct answer to the answer target question message, and it is determined that "restriction on access to an answer message to be answered by the user to the answer target question message is not applied" (S45). After that, the process proceeds to S27. As a result, the answer input screen is displayed through the communication terminal 6 in S29, and the user is allowed to post an answer message to the answer target question message. Accordingly, the user who posted the question message and a third-person user are allowed to access the answer message posted as an answer to the question message.

In S46, the CPU 31 determines whether the answer target question message is a question message for asking information about traffic on the basis of the sentence of the answer target question message acquired in S42. Specifically, when a word relating to traffic is included in the sentence of the answer target question message, it is determined that the answer target question message is a question message for asking information about traffic. The word relating to traffic is, for example, a word that indicates the route name of a train or bus, a route type, the name of an electric train, the name of a station or stop, a road name, a road type, the name of a specific facility, such as an interchange and a service area, or a traffic condition, such as a suspension of service, traffic congestion and closed to traffic, or the like.

When it is determined that the answer target question message is a question message for asking information about traffic (YES in S46), the process proceeds to S47. In contrast to this, when it is determined that the answer target question message is not a question message for asking information about traffic (NO in S46), the process proceeds to S52.

In S47, the CPU 31 determines whether the answer target question message is a question message for asking information about public transportation, such as an electric train and a bus, on the basis of the sentence of the answer target question message acquired in S42. Specifically, when the sentence of the answer target question message includes a word relating to public transportation, it is determined that the answer target question message is a question message for asking information about public transportation. The word relating to public transportation is, for example, a word that indicates the route name of a train or bus, a route type, the name of an electric train, the name of a station or stop, or the like.

When it is determined that the answer target question message is a question message for asking information about public transportation (YES in S47), the process proceeds to S51. In contrast to this, when it is determined that the answer target question message is not a question message for asking information about public transportation (NO in S47), the process proceeds to S48.

In S48, the CPU 31 determines whether the answer target question message is a question message for asking information about a road on the basis of the answer target question message acquired in S42. Specifically, when a word relating to a road is included in the sentence of the answer target question message, it is determined that the answer target question message is a question message for asking information about a road. The word relating to a road is, for example, a word that indicates a road name, a road type, the name of a specific facility, such as an interchange and a service area, or a traffic condition relating to a road, such as traffic congestion and closed to traffic, or the like.

When it is determined that the answer target question message is a question message for asking information about a road (YES in S48), the process proceeds to S49. In contrast to this, when it is determined that the answer target question message is not a question message for asking information about a road (NO in S48), it is recognized that the user (respondent) can have a correct answer to the answer target question message, and it is determined that "restriction on access to an answer message to be answered by the user to the answer target question message is not applied" (S50). After that, the process proceeds to S27. As a result, the answer input screen is displayed through the communication terminal 6 in S29, and the user is allowed to post an answer message to the answer target question message. Accordingly, the user who posted the question message and a third-person user are allowed to access the answer message posted as an answer to the question message.

On the other hand, in S49, the CPU 31 executes road determination process (FIG. 22) (described later). The road determination process is a process of determining whether restriction on access to an answer message to be answered by the user to the answer target question message is applied on the basis of the question location and question contents associated with the answer target question message for asking information about a road, the current location (respondent positional information) of the user (that is, the respondent), and the like.

In S51, the CPU 31 executes public transportation determination process (FIG. 25) (described later). The public transportation determination process is a process of determining whether restriction on access to an answer message to be answered by the user to the answer target question message is applied on the basis of the question location and question contents associated with the answer target question message for asking information about public transportation, the current location (respondent positional information) of the user (that is, the respondent), and the like.

In S52, the CPU 31 determines whether the answer target question message is a question message for asking information about a facility on the basis of the sentence of the answer target question message acquired in S42. Specifically, when a word relating to a facility is included in the sentence of the answer target question message, it is determined that the answer target question message is a question message for asking information about a facility. The word relating to a facility is, for example, a word that indicates a facility name, a product name, a service name, or the activity of the user at the facility, such as shopping, a rest and a meal, or the like.

When it is determined that the answer target question message is a question message for asking information about a facility (YES in S52), the process proceeds to S53. In contrast to this, when it is determined that the answer target question message is not a question message for asking information about a facility (NO in S52), the process proceeds to S54.

In S53, the CPU 31 executes facility determination process (FIG. 27) (described later). The facility determination process is a process of determining whether restriction on access to an answer message to be answered by the user to the answer target question message is applied on the basis of the question location and question contents associated with the answer target question message for asking information about a facility, the current location (respondent positional information) of the user (that is, the respondent), and the like.

On the other hand, in S54, the CPU 31 determines whether the answer target question message is a question message for asking information about an area around the question location on the basis of the sentence of the answer target question message acquired in S42. Specifically, when a word that limits an answer target area is included in the sentence of the answer target question message, it is determined that the answer target question message is a question message for asking information about an area around the question location. The word that limits an answer target area is, for example, a word that indicates a weather condition (shiny, cloud, rainy), a geographical name or an event name, or the like.

When it is determined that the answer target question message is a question message for asking information about an area around the question location (YES in S54), the process proceeds to S55. In contrast to this, when it is determined that the answer target question message is not a question message for asking information about an area around the question location (NO in S54), it is recognized that the user (respondent) can have a correct answer to the answer target question message, and it is determined that "restriction on access to an answer message to be answered by the user to the answer target question message is not applied" (S45). After that, the process proceeds to S27. As a result, the answer input screen is displayed through the communication terminal 6 in S29, and the user is allowed to post an answer message to the answer target question message. Accordingly, the user who posted the question message and a third-person user are allowed to access the answer message posted as an answer to the question message.

In S55, the CPU 31 executes range determination process (FIG. 29) (described later). The range determination process is a process of determining whether restriction on access to an answer message to be answered by the user to the answer target question message is applied on the basis of the question location and question contents associated with the answer target question message for asking information about an area around the question location, the current location (respondent positional information) of the user (that is, the respondent), and the like.

Figure 19:
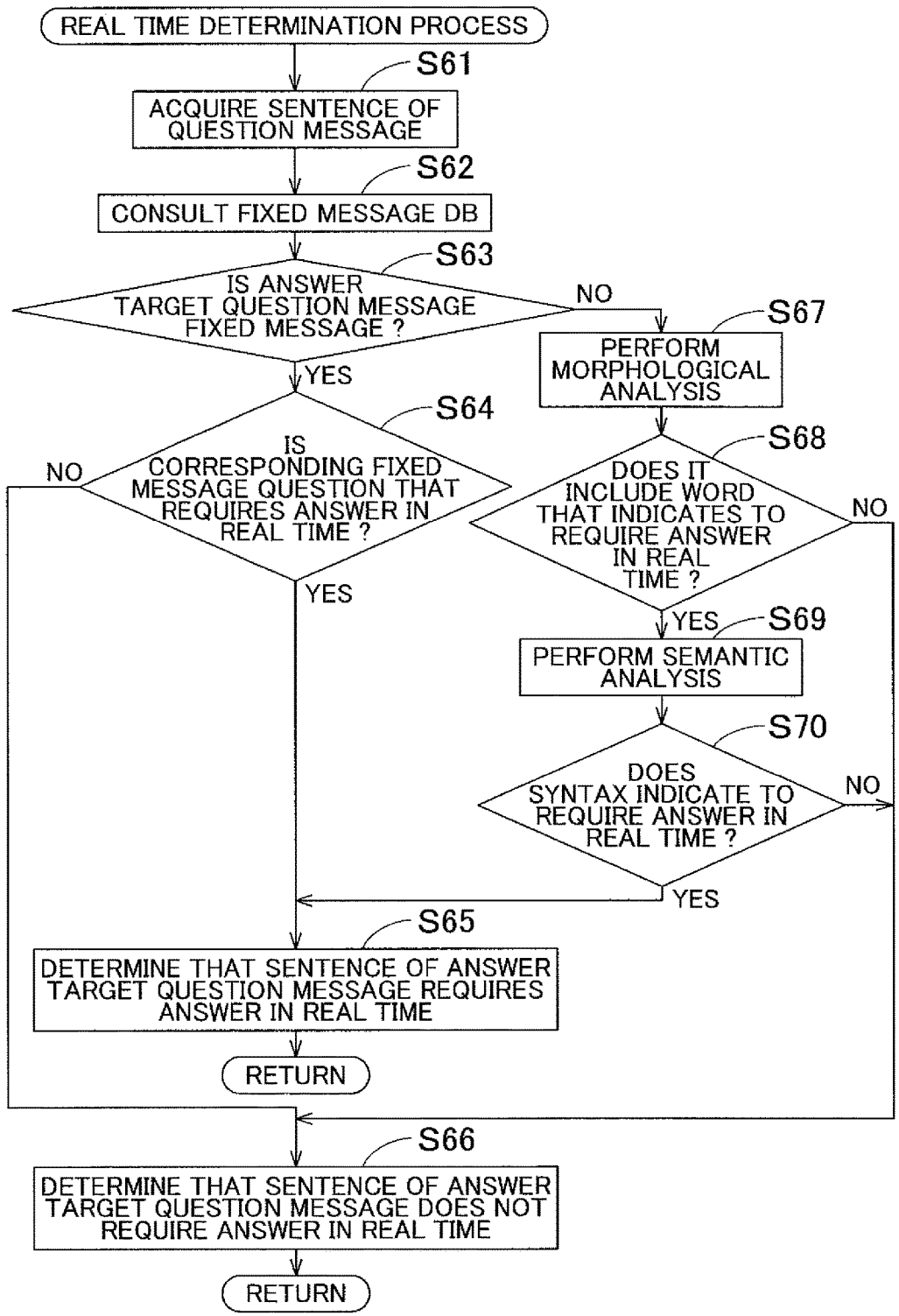
FIG. 19 is a flowchart of a sub-process program of a real time determination process according to the first embodiment.

Next, the sub-process of the real time determination process that is executed in S43 will be described with reference to FIG. 19. FIG. 19 is a flowchart of the sub-process program of the real time determination process.

Initially, in S61 the CPU 31 acquires the sentence of the answer target question message to be answered.

Subsequently, in S62, the CPU 31 reads out the fixed message DB stored in the memory 32. Here, the fixed message DB is the DB in which the multiple-type fixed messages having a high usage frequency as question messages and answer messages are recorded. FIG. 20 is a view that shows an example of the fixed message DB. As shown in FIG. 20, multiple-type fixed messages are recorded in the fixed message DB for each of the question message and the answer message. Furthermore, each fixed message that is used as a question message is associated with information for identifying whether it is a question that requires an answer in real time. For example, the question message "How about traffic congestion condition?" is associated with information that a question that requires an answer in real time; whereas the question message "Does this shop serve delicious food?" is associated with information that a question that does not require an answer in real time.

Subsequently, in S63, the CPU 31 determines whether the sentence of the answer target question message acquired in S1 corresponds to any one of the fixed messages stored in the fixed message DB. Even when both the sentences do not completely coincide with each other, it is desirable to determine that the sentence corresponds to the fixed message when they coincide with each other at a predetermined percentage or higher.

When it is determined that the sentence of the answer target question message acquired in S1 corresponds to any one of the fixed messages stored in the fixed message DB (YES in S63), the process proceeds to S64. In contrast to this, when it is determined that the sentence of the answer target question message acquired in S1 does not correspond to any one of the fixed messages stored in the fixed message DB (NO in S63), the process proceeds to S67.

In S64, the CPU 31 determines whether the corresponding fixed message determined in S63 is a question that requires an answer in real time on the basis of the fixed message DB (FIG. 20) read out in S62. As described above, in the fixed message DB, each fixed message that is used as a question message is associated with information for identifying whether it is a question that requires an answer in real time (correspondence relationship information), and, in S64, determination is made on the basis of the correspondence relationship information.

When it is determined that the determined corresponding fixed message is a question that requires an answer in real time (YES in S64), it is determined that "the answer target question message is a question that requires an answer in real time" (S65). After that, the process proceeds to S44. From S44, the process is executed on the basis of the determination result of S65.

In contrast to this, when it is determined that the determined corresponding fixed message is a question that does not require an answer in real time (NO in S64), it is determined that "the answer target question message is a question that does not require an answer in real time" (S66). After that, the process proceeds to S44. From S44, the process is executed on the basis of the determination result of S66.

On the other hand, from S67, the CPU 31 determines whether the answer target question message is a question that requires an answer in real time by performing a syntactic analysis on the answer target question message. Initially, in S67, the CPU 31 performs a morphological analysis on the answer target question message. Specifically, the sentence that constitutes the answer target question message is divided into word (morpheme) units, and the word class of each word unit is determined.

In S68, the CPU 31 particularly determines whether any one of words determined to be a noun corresponds to a word that indicates to require an answer in real time on the basis of the result of the morphological analysis in S67. The word that indicates to require an answer in real time is, for example, a word that indicates an incident that fluctuates with time, such as rainy, shiny, traffic congestion and crowdedness. Such words that indicate to require an answer in real time may be configured to be determined in advance and held as a DB, may be determined at the server side or may be configured to be downloaded from the server.

When it is determined that a word that indicates to require an answer in real time is included (YES in S68), process proceeds to S69. In contrast to this, when it is determined that a word that indicates to require an answer in real time is not included (NO in S68), it is determined that "the answer target question message is a question that does not require an answer in real time" (S66). After that, the process proceeds to S44. From S44, the process is executed on the basis of the determination result of S66.

On the other hand, in S67, the CPU 31 performs a morphological analysis on the answer target question message. Specifically, the sentence that constitutes the answer target question message is divided into word (morpheme) units, and the word class of each word unit is determined.

In S69, the CPU 31 performs a semantic analysis on the answer target question message. Specifically, an operator precedence method, a top-down syntactic analysis method, a bottom-up syntactic analysis method, or the like, is used, and the grammatical relationship of the answer target question message, such as a present tense, a past tense, a future tense and a present progressive tense, is determined.

Subsequently, in S70, the CPU 31 determines whether the sentence of the answer target question message corresponds to a syntax that indicates to require an answer in real time on the basis of the result of the semantic analysis in S69. The syntax that indicates to require an answer in real time is, for example, a present-tense syntax, a present-progressive-tense syntax, or the like.

When it is determined that the sentence of the answer target question message is the syntax that indicates to require an answer in real time (YES in S70), it is determined that "the answer target question message is a question that requires an answer in real time" (S65). After that, the process proceeds to S44. From S44, the process is executed on the basis of the determination result of S65.

In contrast to this, when it is determined that the sentence of the answer target question message is not a syntax that indicates to require an answer in real time (NO in S70), it is determined that "the answer target question message is a question that does not require an answer in real time" (S66).

After that, the process proceeds to S44. From S44, the process is executed on the basis of the determination result of S66.

Hereinafter, the details of the determination process through the syntactic analysis in S67 to S70 will be described by way of a specific example. For example, description will be made on an example in which the determination process through the syntactic analysis in S67 to S70 is executed on four-type question messages of Example sentence 1 to Example sentence 4 shown in FIG. 21. In the case where the question message "Is it rainy?" shown in Example sentence 1 is an answer target question message, as a result of the morphological analysis in S67, it is determined that the word "rainy" that indicates the state of a weather condition, included in the sentence, is a word that indicates an incident that fluctuates with time and is a word that indicates to require an answer in real time. Furthermore, as a result of the semantic analysis in S69, it is determined that the sentence has a present tense and has a syntax that indicates to require an answer in real time. Thus, the question message shown in Example sentence 1 is finally determined to be "a question that requires an answer in real time" (S65). In the case where the question message "Was it rainy yesterday?" shown in Example sentence 2 is an answer target question message, as a result of the morphological analysis in S67, it is determined that the word "rainy" that indicates the state of a weather condition, included in the sentence, is a word that indicates an incident that fluctuates with time and is a word that indicates to require an answer in real time. However, as a result of the semantic analysis in S69, it is determined that the sentence has a past tense and does not have a syntax that indicates to require an answer in real time. Thus, the question message shown in Example sentence 2 is finally determined to be "not a question that requires to answer in real time" (S66). In the case where the question message "Is this shop crowded?" shown in Example sentence 3 is an answer target question message, as a result of the morphological analysis in S67, it is determined that the word "crowded" that indicates the degree of crowdedness, included in the sentence, is a word that indicates an incident that fluctuates with time and is a word that indicates to require an answer in real time. Furthermore, as a result of the semantic analysis in S69, it is determined that the sentence has a present tense and has a syntax that indicates to require an answer in real time. Thus, the question message shown in Example sentence 3 is finally determined to be "a question that requires an answer in real time" (S65). In the case where the question message "Does this shop serve delicious food?" shown in Example sentence 4 is an answer target question message, as a result of the morphological analysis in S67, it is determined that a word that indicates to require an answer in real time is not included in the sentence. Thus, the question message shown in Example sentence 4 is finally determined to be "not a question that requires to answer in real time" (S66).

Figure 22:
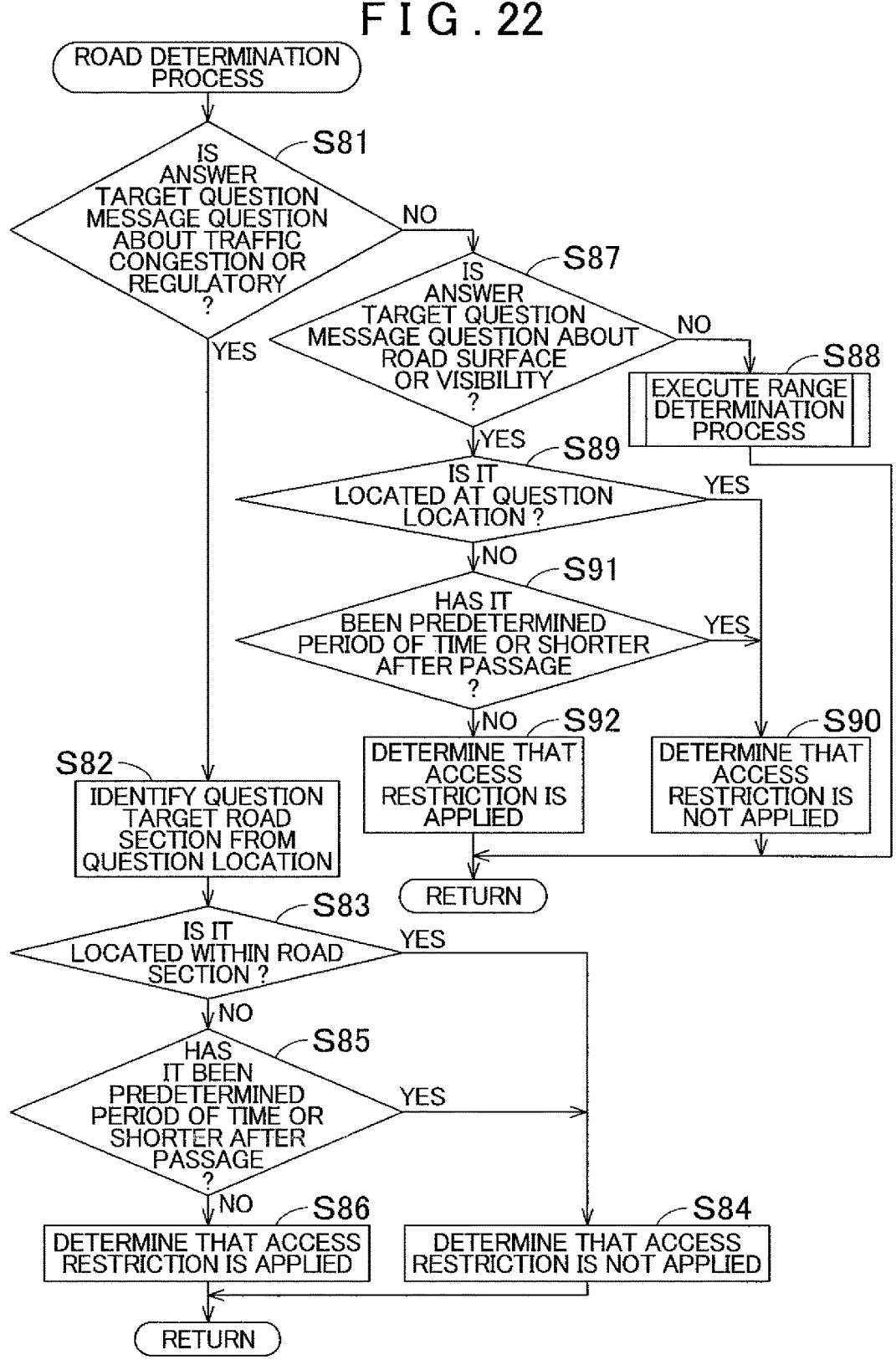
FIG. 22 is a flowchart of a sub-process program of a road determination process according to the first embodiment.

Next, the sub-process of the road determination process that is executed in S49 will be described with reference to FIG. 22. FIG. 22 is a flowchart of the sub-process program of the road determination process.

Initially, in S81, the CPU 31 determines whether the answer target question message is a question message for particularly asking information about traffic congestion or regulatory on the basis of the sentence of the answer target question message acquired in S42. Specifically, when a word relating to traffic congestion or regulatory is included in the sentence of the answer target question message, it is determined that the answer target question message is a question message for asking information about traffic congestion or regulatory. The word relating to traffic congestion or regulatory is, for example, a word, such as traffic congestion, crowded, available, closed to traffic, accident, construction, or the like.

When it is determined that the answer target question message is a question message for asking information about traffic congestion or regulatory (YES in S81), the process proceeds to S82. In contrast to this, when it is determined that the answer target question message is not a question message for asking information about traffic congestion or regulatory (NO in S81), the process proceeds to S87.

In S82, the CPU 31 identifies the section of a road, which is a question target, (hereinafter, referred to as question target section) on the basis of the question location associated with the answer target question message and the map information. Specifically, a road link that includes the question location is identified as the question target section. When the question location is not present on any link, a road link closest to the question location is identified as the question target section. The map information may be acquired from the memory 32 in the communication terminal 6 or may be acquired from an external server through communication. The question target section may be identified by not a link but a route number (for example, Prefectural Highway OO) or a section at a predetermined distance from the question location (for example, a section within the range of 10 km behind to 10 km ahead).

Subsequently, in S83, the CPU 31 determines whether the current location of the user is located within the question target section on the basis of the current location of the user (respondent) who answers the answer target question message, acquired in S41, and the question target section identified in S82.

When it is determined that the current location of the user is located within the question target section (YES in S83), the process proceeds to S84. In contrast to this, when the current location of the user is not located within the question target section (NO in S83), the process proceeds to S85.

In S84, because the user is located within the same link (that is, the link that is a question target about traffic congestion or regulatory) of the question location, the CPU 31 recognizes that the user can have a correct answer to the answer target question message, and determines that "restriction on access to an answer message to be answered by the user to the answer target question message is not applied". After that, the process proceeds to S27. As a result, the answer input screen is displayed through the communication terminal 6 in S29, and the user is allowed to post an answer message to the answer target question message. Accordingly, the user who posted the question message and a third-person user are allowed to access the answer message posted as an answer to the question message.

In S85, the CPU 31 determines whether it has been a predetermined period of time (for example, ten minutes) or shorter after the user passed the question target section (or within a predetermined distance (for example, within 3 km) from the question target section) on the basis of the history of the current location of the user who answers the answer target question message and the question target section identified in S82. The predetermined period of time is a threshold stored in the memory, or the like, and is set in consideration of user's memory, or the like.

When it is determined that it has been the predetermined period of time or shorter after the user passed the question target section (YES in S85), that is, when it is determined that the user was located in the question target section within the last predetermined period of time, the process proceeds to S84. Then, because the user was located until recently within the same link (that is, the link that is a question target about traffic congestion or regulatory) of the question location, it is recognized that the user can have a correct answer to the answer target question message, and it is determined that "restriction on access to an answer message to be answered by the user to the answer target question message is not applied".

In contrast to this, when it is determined that the user has not passed the question target section or it has been the predetermined period of time or longer after the user passed the question target section (NO in S85), that is, when it is determined that that user was not located in the question target section within the last predetermined period of time, the process proceeds to S86.

In S86, because the user is not present in the same link (that is, the link that is a question target about traffic congestion or regulatory) of the question location and there is no history that the user was present until recently, the CPU 31 recognizes that the user cannot have a correct answer to the answer target question message, and determines that "restriction on access to an answer message to be answered by the user to the answer target question message is applied". After that, the process proceeds to S27. As a result, the answer input screen is not displayed through the communication terminal 6 (S28), and the user is not allowed to post an answer message to the answer target question message. Accordingly, the user who posted the question message and a third-party user are not allowed to access an answer message that is posted as an answer to the question message.

Figure 23:
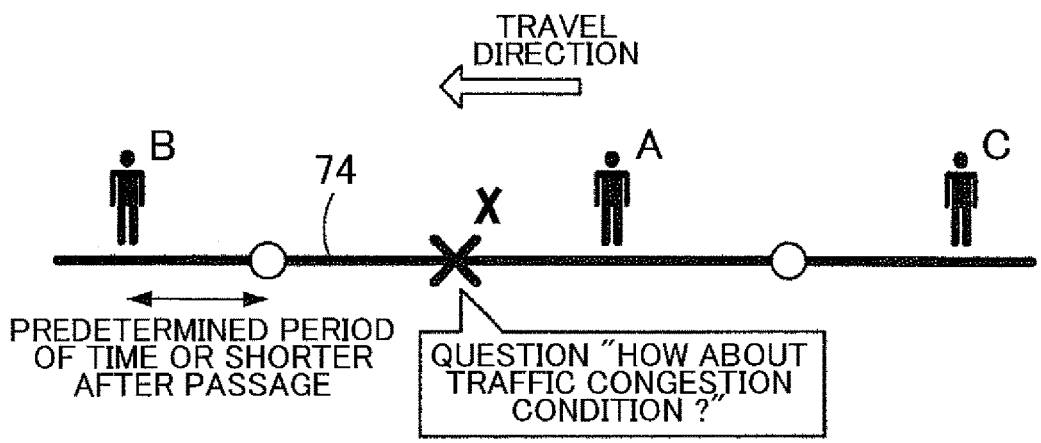
FIG. 23 is a view that shows an example of a user of which a posted answer message is determined to be applied with restriction on access and a user of which a posted answer message is determined to be not applied with restriction on access in the road determination process.

Hereinafter, the determination process in S83 to S86 will be described by way of a specific example. In FIG. 23, description will be made on the case where there are Users A to C as respondents and the answer target question message is a question message for asking a traffic congestion condition of a road on which a question location X is specified. In the example shown in FIG. 23, User A present in the same link 74 as the question location X can have a correct answer (that is, a traffic congestion condition of the link 74) of the answer target question message, so it is determined that "restriction on access to an answer message to be answered by User A to the answer target question message is not applied". In addition, User B who is not located within the same link 74 as the question location X but it has been the predetermined period of time or shorter after the user passed the link 74 also can have a correct answer to the answer target question message, so it is determined that "restriction on access to an answer message to be answered by User B to the answer target question message is not applied". On the other hand, User C who has not reached the same link 74 as the question location X cannot have a correct answer to the answer target question message, so it is determined that "restriction on access to an answer message to be answered by User C to the answer target question message is applied".

On the other hand, in S87, the CPU 31 determines whether the answer target question message is particularly a question message for asking information about a road surface or visibility on the basis of the sentence of the answer target question message acquired in S42. Specifically, when a word relating to a road surface or visibility is included in the sentence of the answer target question message, it is determined that the answer target question message is a question message for asking information about a road surface or visibility. The word relating to a road surface or visibility is, for example, a word, such as unevenness, step, gap, visibility, light and fog.

When it is determined that the answer target question message is a question message for asking information about a road surface or visibility (YES in S87), the process proceeds to S89. In contrast to this, when it is determined that the answer target question message is not a question message for asking information about a road surface or visibility (NO in S87), the process proceeds to S88.

In S88, the CPU 31 executes range determination process (FIG. 29) (described later). The range determination process is a process of determining whether restriction on access to an answer message to be answered by the user to the answer target question message is applied on the basis of the question location and question contents associated with the answer target question message for asking information about an area around the question location, the current location (respondent positional information) of the user (that is, the respondent), and the like.

On the other hand, in S89, the CPU 31 determines whether the current location of the user is located at the question location on the basis of the current location of the user (respondent) who answers the answer target question message, acquired in S41, and the question location associated with the answer target question message, that is, the positional information associated with the question message (question positional information).

When it is determined that the current location of the user is located at the question location (YES in S89), the process proceeds to S90. In contrast to this, when it is determined that the current location of the user is not located at the question location (NO in S89), the process proceeds to S91.

In S90, because the user is located within the question location (that is, the location that is a question target about a road surface or visibility), the CPU 31 recognizes that the user can have a correct answer to the answer target question message, and determines that "restriction on access to an answer message to be answered by the user to the answer target question message is not applied". After that, the process proceeds to S27. As a result, the answer input screen is displayed through the communication terminal 6 in S29, and the user is allowed to post an answer message to the answer target question message. Accordingly, the user who posted the question message and a third-person user are allowed to access the answer message posted as an answer to the question message.

In S91, the CPU 31 determines whether it has been a predetermined period of time (for example, ten minutes) or shorter after the user passed the question location (or within a predetermined distance (for example, within 3 km) from the question location) on the basis of the history of the current location of the user who answers the answer target question message and the question location associated with the answer target question message, that is, the positional information associated with the question message (question positional information). The predetermined period of time is a threshold stored in the memory, or the like, and is set in consideration of user's memory, or the like.

When it is determined that it has been the predetermined period of time or shorter after the user passed the question location (YES in S91), the process proceeds to S90. Because the user was recently present at the question location (that is, the location that is a question target about a road surface or visibility), it is recognized that the user can have a correct answer to the answer target question message, and it is determined that "restriction on access to an answer message to be answered by the user to the answer target question message is not applied".

In contrast to this, when it is determined that the user has not passed the question location or it has been the predetermined period of time or longer after the user passed the question location (NO in S91), that is, when it is determined that that user was not located at the question location within the last predetermined period of time, the process proceeds to S92.

In S92, because the user is not present at the question location (that is, the location that is a question target about a road surface or visibility) and there is no history that the user was present until recently, the CPU 31 recognizes that the user cannot have a correct answer to the answer target question message, and determines that "restriction on access to an answer message to be answered by the user to the answer target question message is applied". After that, the process proceeds to S27. As a result, the answer input screen is not displayed through the communication terminal 6 (S28), and the user is not allowed to post an answer message to the answer target question message. Accordingly, the user who posted the question message and a third-party user are not allowed to access an answer message that is posted as an answer to the question message.

Figure 24:
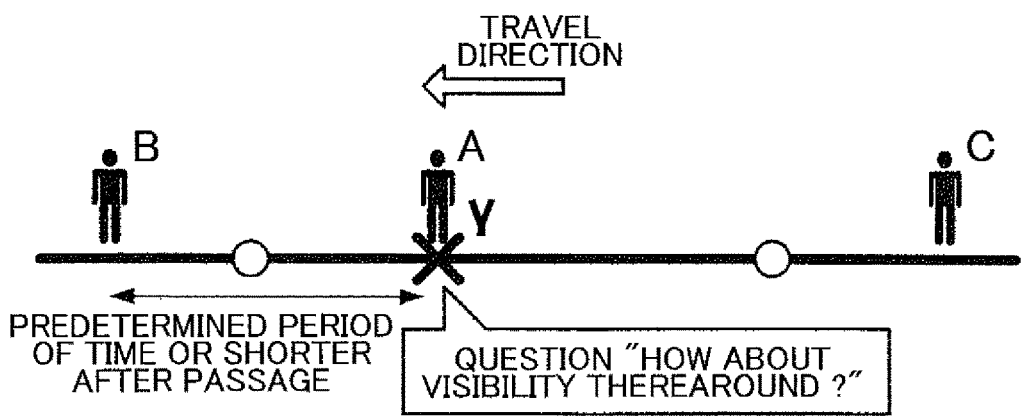
FIG. 24 is a view that shows an example of a user of which a posted answer message is determined to be applied with restriction on access and a user of which a posted answer message is determined to be not applied with restriction on access in the road determination process.

Hereinafter, the determination process in S89 to S92 will be described by way of a specific example. In FIG. 24, description will be made on the case, where there are Users A to C as respondents and the answer target question message is a question message for asking a visibility condition of a road on which a question location Y is specified. In the example shown in FIG. 24, User A present at the question location Y can have a correct answer (that is, a visibility condition around the location Y) of the answer target question message, so it is determined that "restriction on access to an answer message to be answered by User A to the answer target question message is not applied". In addition, User B who is not located at the question location Y but it has been the predetermined period of time or shorter after the user passed the location Y also can have a correct answer to the answer target question message, so it is determined that "restriction on access to an answer message to be answered by User B to the answer target question message is not applied". On the other hand, User C who has not reached the question location Y cannot have a correct answer to the answer target question message, so it is determined that "restriction on access to an answer message to be answered by User C to the answer target question message is applied".

Figure 25:
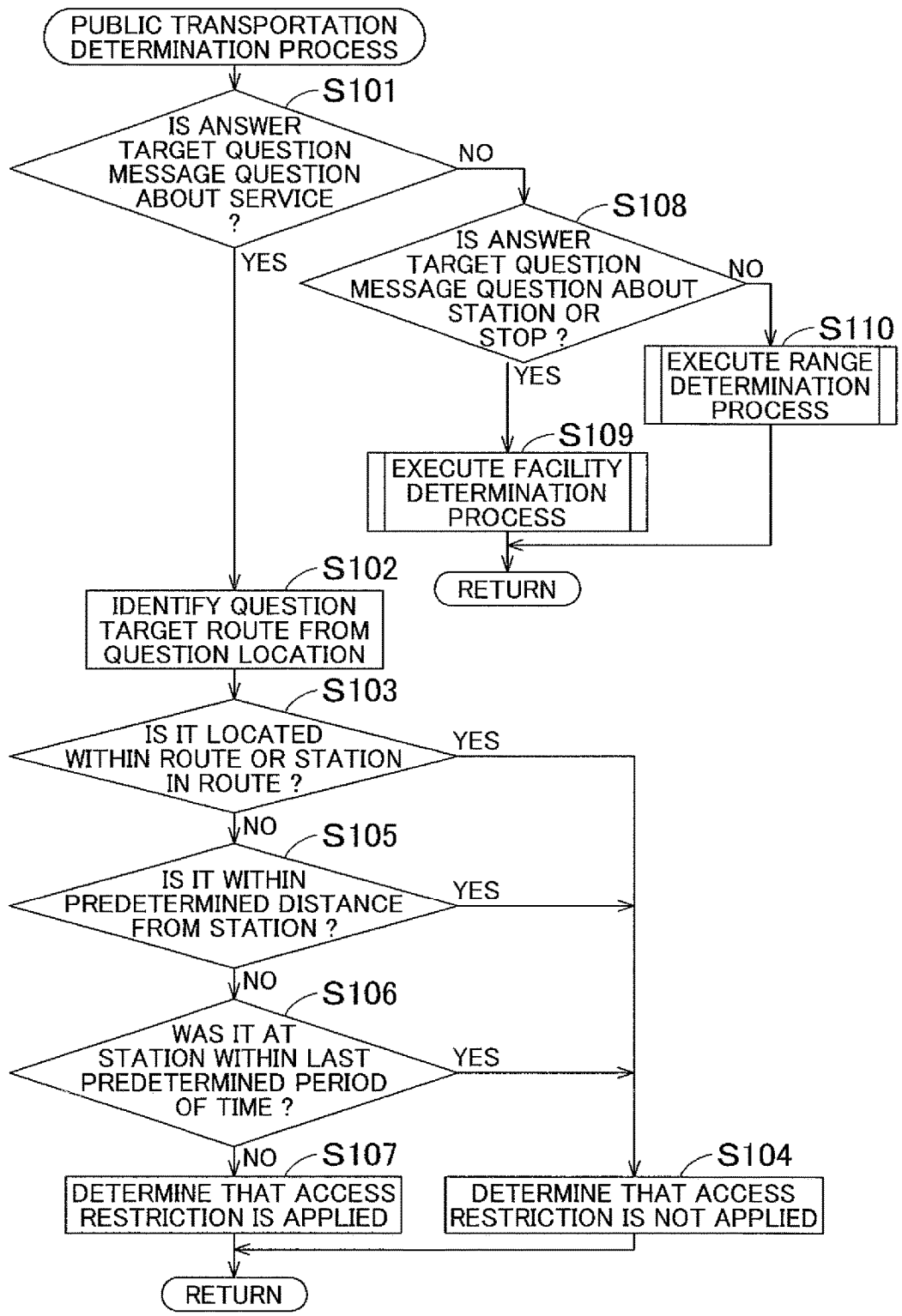
FIG. 25 is a flowchart of a sub-process program of a public transportation determination process according to the first embodiment.

Next, the sub-process of the public transportation determination process that is executed in S51 will be described with reference to FIG. 25. FIG. 25 is a flowchart of the sub-process program of the public transportation determination process.

Initially, in S101, the CPU 31 determines whether the answer target question message is a question message for particularly asking information about the service of public transportation on the basis of the sentence of the answer target question message acquired in S42. Specifically, when the sentence of the answer target question message includes a word relating to the service of public transportation, it is determined that the answer target question message is a question message for asking information about the service of public transportation. The word relating to the service of public transportation is, for example, a word that indicates the route name of a train or bus, a route type, the name of an electric train, or the like.

When it is determined that the answer target question message is a question message for asking information about the service of public transportation (YES in S101), the process, proceeds to S102. In contrast to this, when it is determined that the answer target question message is not a question message for asking information about the service of public transportation (NO in S101), the process proceeds to S108.

In S102, the CPU 31 identifies the route of public transportation, which is a question target, (hereinafter, referred to as question target route) on the basis of the question location associated with the answer target question message, that is, the positional information associated with the question message (question positional information) and the map information. Specifically, when the question location is located on a route, the route is identified as the question target route. In addition, when the question location is not present on a route, a route at the closest distance from the question location is identified as the question target route. The map information may be acquired from the memory 32 in the communication terminal 6 or may be acquired from an external server through communication. in addition, the public transportation is a monorail, a cable car, a ferry, or the like, other than a bus or an electric train. In S102, not all the sections of the route of public transportation, which is a question target, but only a section (for example, a section between stations behind and ahead of the question location) that is influenced by an incident that occurs at the question location may be identified.

Subsequently, in S103, the CPU 31 determines whether the current location of the user is located within the question target route or a station (including a stop, a ferry terminal, and the like) in the question target route on the basis of the current location of the user who answers the answer target question message, acquired in S41, and the question target route identified in S102.

When it is determined that the current location of the user is located in the question target route or a station in the question target route (YES in S103), the process proceeds to S104. In contrast to this, when it is determined that the current location of the user is not located in the question target route or a station in the question target route (NO in S103), the process proceeds to S105.

In S104, because the user is located within the question target route or a station in the question target route (that is riding on public transportation for the route that is a question target), the CPU 31 recognizes that the user can have a correct answer to the answer target question message, and determines that "restriction on access to an answer message to be answered by the user to the answer target question message is not applied". After that, the process proceeds to S27. As a result, the answer input screen is displayed through the communication terminal 6 in S29, and the user is allowed to post an answer message to the answer target question message. Accordingly, the user who posted the question message and a third-person user are allowed to access the answer message posted as an answer to the question message.

On the other hand, in S105, the CPU 31 determines whether the user is present within a predetermined distance (for example, within 500 m) from the station in the question target route on the basis of the current location of the user who answers the answer target question message, acquired in S41, and the question target route identified in S102. The predetermined distance is a threshold stored in the memory, or the like, and is set in consideration of user's moving speed, or the like.

When it is determined that the user is present at the predetermined distance from the station in the question target route (YES in S105), the process proceeds to S104. Because it is assumed that the user was located within the question target route until recently (that is, had been riding on public transportation for the route that is a question target until recently), it is recognized that the user can have a correct answer to the answer target question message, and it is determined that "restriction on access to an answer message to be answered by the user to the answer target question message is not applied".

In contrast to this, when it is determined that the user is not present at the predetermined distance from the station in the question target route (NO in S105), the process proceeds to S106.

In S106, the CPU 31 determines whether the user was located at the station in the question target route within the last predetermined period of time (for example, ten minutes) on the basis of the history of the current location of the user who answers the answer target question message and the question target route identified in S102. The predetermined period of time is a threshold stored in the memory, or the like, and is set in consideration of user's memory, or the like.

When it is determined that the user was located at the station in the question target route within the last predetermined period of time (YES in S106), the process proceeds to S104. Because the user was located within the question target route until recently (that is, had been riding on public transportation for the route that is a question target until recently), it is recognized that the user can have a correct answer to the answer target question message, and it is determined that "restriction on access to an answer message to be answered by the user to the answer target question message is not applied".

In contrast to this, when it is determined that the user was not located at the station in the question target route within the last predetermined period of time (NO in S106), the process proceeds to S107.

In S107, because the user did not ride on public transportation in the question target route and there is no history that the user had been riding until recently, the CPU 31 recognizes that the user cannot have a correct answer to the answer target question message, and determines that "restriction on access to an answer message to be answered by the user to the answer target question message is applied". After that, the process proceeds to S27. As a result, the answer input screen is not displayed through the communication terminal 6 (S28), and the user is not allowed to post an answer message to the answer target question message. Accordingly, the user who posted the question message and a third-party user are not allowed to access an answer message that is posted as an answer to the question message.

Figure 26:
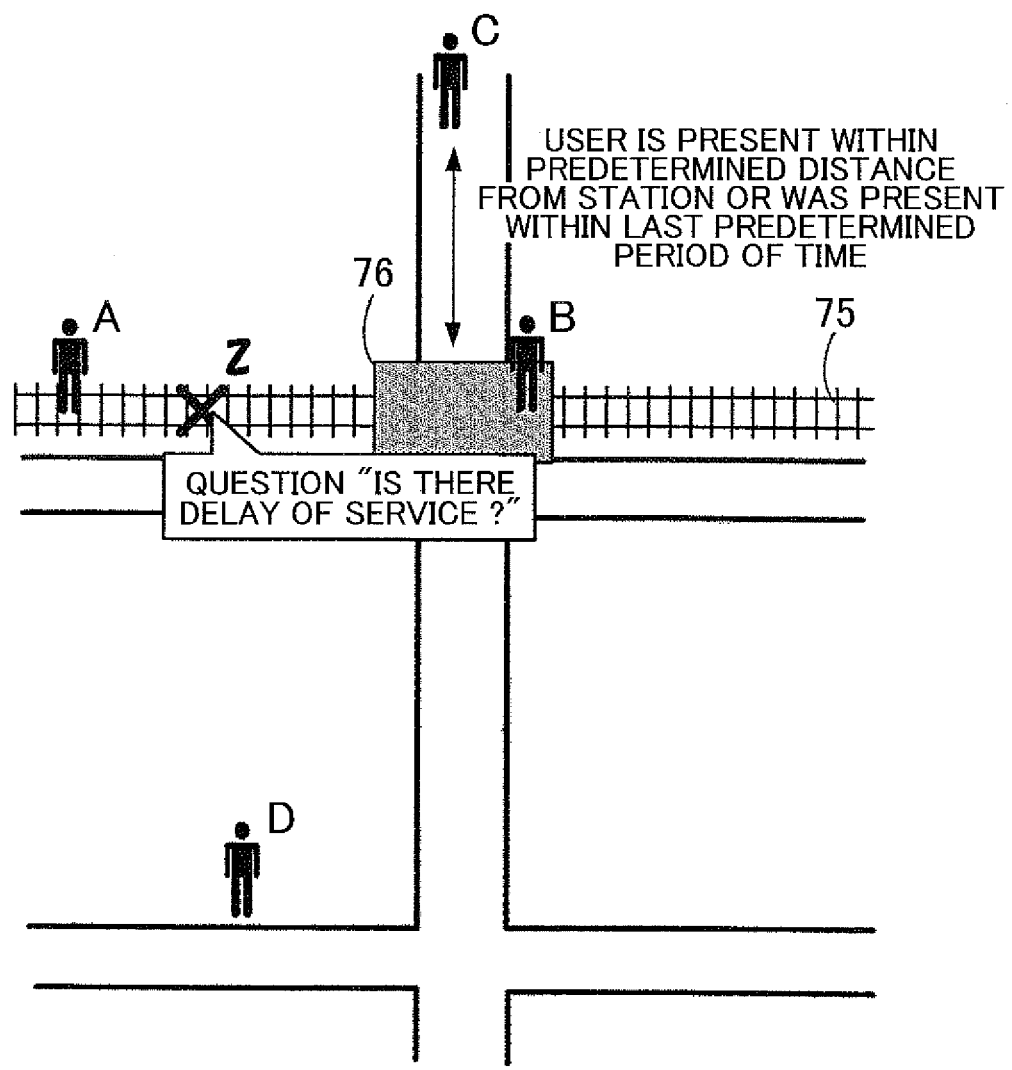
FIG. 26 is a view that shows an example of a user of which a posted answer message is determined to be applied with restriction on access and a user of which a posted answer message is determined to be not applied with restriction on access in the public transportation determination process.

Hereinafter, the determination process in S103 to S107 will be described by way of a specific example. In FIG. 26, description will be made on the case where there are Users A to D as respondents and the answer target question message is a question message for asking the service situation of a route 75 on which a question location Z is specified. In the example shown in FIG. 26, User A present within the same route as the question target route 75 and User B present within a station 76 in the question target route 75 can have a correct answer (that is, the service situation of the route 75) to the answer target question message, so it is determined that "restriction on access to an answer message to be answered by User A or User B to the answer target question message is not applied". In addition, User C who is not located within the question target route 75 or the station 76 but is located within the predetermined distance from the station 76 (or was located at the station 76 the predetermined period of time before) can also have a correct answer to the answer target question message, so it is determined that "restriction on access to an answer message to be answered by User C to the answer target question message is not applied". On the other hand, User D who is not located at the question target route 75 or the station 76 and is located remote from the station 76 cannot have a correct answer to the answer target question message, so it is determined that "restriction on access to an answer message to be answered by User D to the answer target question message is applied". In the above-described example, the description is made on the example in which restriction on access is not applied in the case where the respondent is not located within the question target route 75 or the station 76 but is located within the predetermined distance from the station 76 (or was located at the station 76 the predetermined period of time before); instead, it may be configured such that restriction on access is not applied in the case where the respondent is not located within the question target route 75 or the station 76 but is located within the predetermined distance from the station 76 and was located at the station 76 the predetermined period of time before. Specifically, it may be implemented by modifying the flowchart of FIG. 25 as will be described later. That is, negative determination from S105 to S106 in FIG. 25 is changed to affirmative determination that means AND condition, the process of S107 is executed after the process of S106 is executed, affirmative determination from S105 to S104 is deleted, negative determination in the determination process of S105 is inserted from S105 to between S106 and S107, and the process of S107 is executed after the negative determination. Thus, it is possible to determine the case where the respondent is not located within the question target route 75 or the station 76 but is located within the predetermined distance from the station 76 and was located at the station 76 the predetermined period of time before. In this case, it is possible to set only a user who goes out from a station yard for an answer respondent, so it is possible to set a user who could have had a correct answer to the answer target question message as a target.

On the other hand, in S108, the CPU 31 determines whether the answer target question message is particularly a question message for asking information about a station or stop on the basis of the sentence of the answer target question message acquired in S42. Specifically, when a word relating to a station or stop is included in the sentence of the answer target question message, it is determined that the answer target question message is a question message for asking information about a station or a stop. The word relating to a station or stop is, for example, a word, such as the name of a station and the name of a stop.

When it is determined that the answer target question message is a question message for asking information about a station or a stop (YES in S108), the process proceeds to S109. In contrast to this, when it is determined that the answer target question message is not a question message for asking information about a station or a stop (NO in S108), the process proceeds to S110.

In S109, the CPU 31 executes facility determination process (FIG. 27) (described later). The facility determination process is a process of determining whether restriction on access to an answer message to be answered by the user to the answer target question message is applied on the basis of the question location and question contents associated with the answer target question message for asking information about a facility, the current location (respondent positional information) of the user (that is, the respondent), and the like.

In S110, the CPU 31 executes range determination process (FIG. 29) (described later). The range determination process is a process of determining whether restriction on access to an answer message to be answered by the user to the answer target question message is applied on the basis of the question location, that is, the positional information associated with the question message (question positional information), and question contents, associated with the answer target question message for asking information about an area around the question location, the current location (respondent positional information) of the user (that is, the respondent), and the like.

Figure 27:
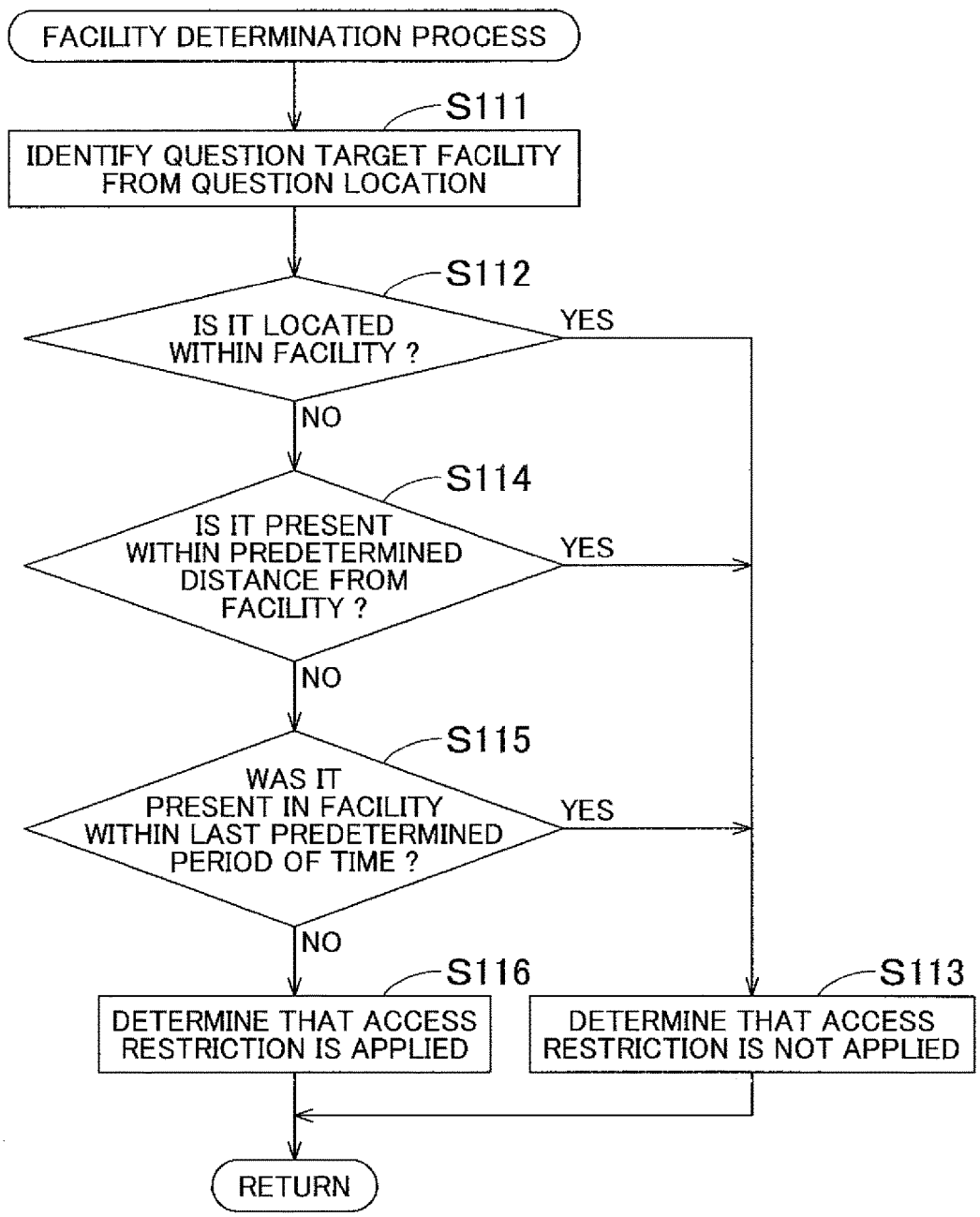
FIG. 27 is a flowchart of a sub-process program of a facility determination process according to the first embodiment.

Next, the sub-process of the facility determination process that is executed in S53 or S109 will be described with reference to FIG. 27. FIG. 27 is a flowchart of the sub-process program of the facility determination process.

Initially, in S111, the CPU 31 identifies a facility that is a question target (hereinafter, referred to as question target facility) on the basis of the question location associated with the answer target question message, that is, the positional information associated with the question message (question positional information), and the map information. Specifically, when the question location is present at a facility, the facility is identified as the question target facility. In addition, when the question location is not present at a facility, a facility present at a distance closest from the question location is identified as the question target facility. The map information may be acquired from the memory 32 in the communication terminal 6 or may be acquired from an external server through communication.

Subsequently, in S112, the CPU 31 determines whether the current location of the user is located within the question target facility on the basis of the current location of the user who answers the answer target question message, acquired in S41, and the question target facility identified in S111.

When it is determined that the current location of the user is located within the question target facility (YES in S112), the process proceeds to S113. In contrast to this, when it is determined that the current location of the user is not located within the question target facility (NO in S112), the process proceeds to S114.

In S113, because the user is located within the question target facility, the CPU 31 recognizes that the user can have a correct answer to the answer target question message, and determines that "restriction on access to an answer message to be answered by the user to the answer target question message is not applied". After that, the process proceeds to S27. As a result, the answer input screen is displayed through the communication terminal 6 in S29, and the user is allowed to post an answer message to the answer target question message. Accordingly, the user who posted the question message and a third-person user are allowed to access the answer message posted as an answer to the question message.

On the other hand, in S114; the CPU 31 determines whether the user is present within a predetermined distance (for example, within 500 m) from the question target facility on the basis of the current location of the user who answers the answer target question message, acquired in S41, and the question target facility identified in S111. The predetermined distance is a threshold stored in the memory, or the like, and is set in consideration of user's moving speed, or the like.

When it is determined that the user is present at the predetermined distance from the question target facility (YES in S114), the process proceeds to S113. Because it is assumed that the user had been staying at the question target facility until recently, it is recognized that the user can have a correct answer to the answer target question message, and it is determined that "restriction on access to an answer message to be answered by the user to the answer target question message is not applied".

When it is determined that the user is not present at the predetermined distance from the question target facility (NO in S114), the process proceeds to S115.

In S115, the CPU 31 determines whether the user was located at the question target facility within the last predetermined period of time (for example, ten minutes) on the basis of the history of the current location of the user who answers the answer target question message and the question target facility identified in S111. The predetermined period of time is a threshold stored in the memory, or the like, and is set in consideration of user's memory, or the like.

When it is determined that the user was located at the question target facility within the last predetermined period of time (YES in S115), the process proceeds to S113. Because the user had been staying at the question target facility until recently, it is recognized that the user can have a correct answer to the answer target question message, and it is determined that "restriction on access to an answer message to be answered by the user to the answer target question message is not applied".

In contrast to this, when it is determined that the user was not located at the question target facility within the last predetermined period of time (NO in S115), the process proceeds to S116.

In S116, because the user did not stay at the question target facility and there is no history that the user had been stayed until recently, the CPU 31 recognizes that the user cannot have a correct answer to the answer target question message, and determines that "restriction on access to an answer message to be answered by the user to the answer target question message is applied". After that, the process proceeds to S27. As a result, the answer input screen is not displayed through the communication terminal 6 (S28), and the user is not allowed to post an answer message to the answer target question message. Accordingly, the user who posted the question message and a third-party user are not allowed to access an answer message that is posted as an answer to the question message.

Figure 28:
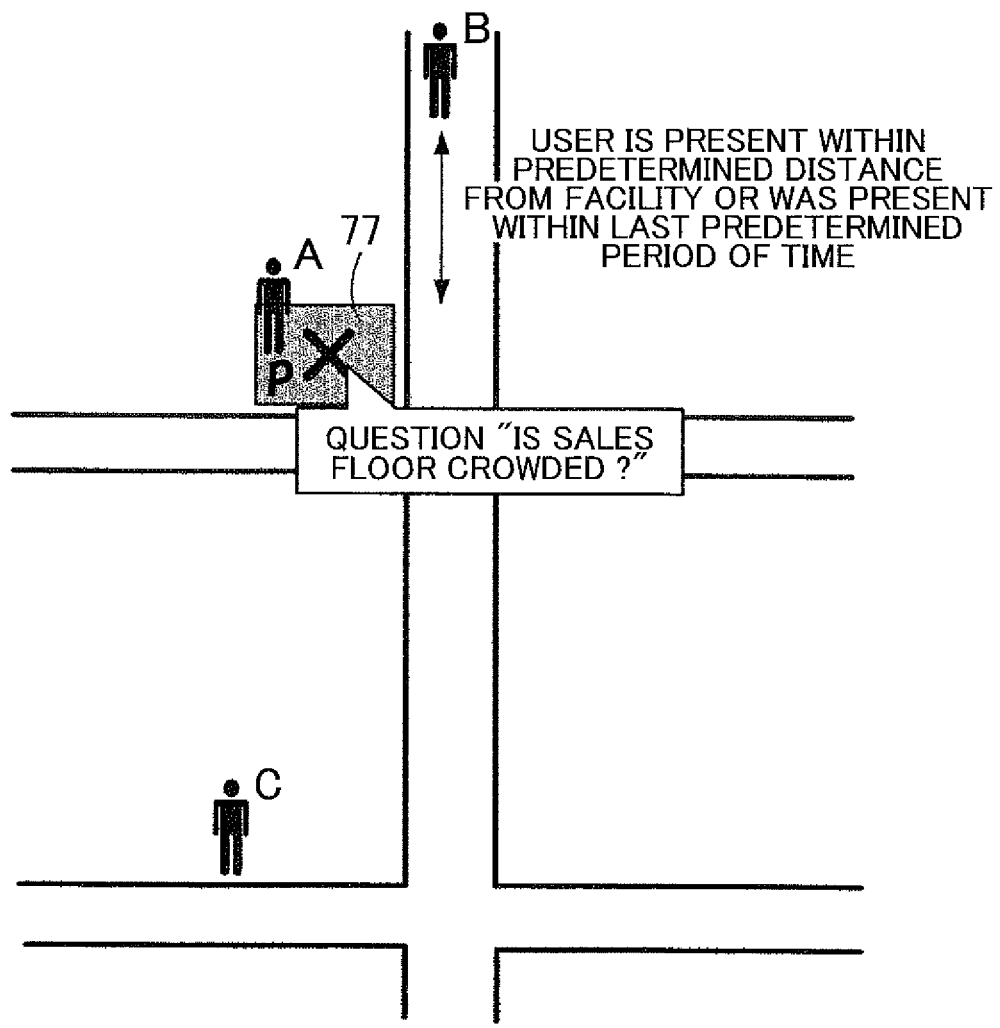
FIG. 28 is a view that shows an example of a user of which a posted answer message is determined to be applied with restriction on access and a user of which a posted answer message is determined to be not applied with restriction on access in the facility determination process.

Hereinafter, the determination process in S112 to S116 will be described by way of a specific example. In FIG. 28, description will be made on the case where there are Users A to C as respondents and the answer target question message is a question message for asking a crowded condition of a facility 77 on which a question location P is specified. In the example shown in FIG. 28, User A present at the question target facility 77 can have a correct answer (that is, a crowded condition of the question target facility 77) of the answer target question message, so it is determined that "restriction on access to an answer message to be answered by User A to the answer target question message is not applied". In addition, User B who is not located within the question target facility 77 but is located within the predetermined distance from the question target facility 77 (or was located at the question target facility 77 the predetermined period of time before) can also have a correct answer to the answer target question message, so it is determined that "restriction on access to an answer message to be answered by User B to the answer target question message is not applied". On the other hand, User C who is not located within the question target facility 77 and is located remote from the question target facility 77 cannot have a correct answer to the answer target question message, so it is determined that "restriction on access to an answer message to be answered by User C to the answer target question message is applied". In the above-described example, the description is made on the example in which restriction on access is not applied in the case where the respondent is located within the predetermined distance from the question target facility 77 (or was located at the question target facility 77 the predetermined period of time before); instead, it may be configured such that restriction on access is not applied in the case where the respondent is located within the predetermined distance from the question target facility 77 and was located at the question target facility 77 the predetermined period of time before. Specifically, it may be implemented by modifying the flowchart of FIG. 27 as will be described later. That is, negative determination from S114 to S115 in FIG. 27 is changed to affirmative determination that means AND condition, the process of S115 is executed after the process of S114 is executed, affirmative determination from S114 to S113 is deleted, negative determination in the determination process of S114 is inserted from S114 to between S115 and S116, and the process of S116 is executed at the time of negative determination. Thus, it is possible to determine the case where the respondent is located within the predetermined distance from the question target facility 77 and was located at the question target facility 77 the predetermined period of time before. In this case, it is possible to set only a user who goes out from a question target facility for an answer respondent, so it is possible to set a user who could have had a correct answer to the answer target question message as a target.

Next, the sub-process of the range determination process that is executed in S55, S88 or S110 will be described with reference to FIG. 29. FIG. 29 is a flowchart of the sub-process program of the range determination process.

Initially, in S121, the CPU 31 determines whether the answer target question message is a question message for particularly asking information about a wide area (for example, prefectures, cities, wards, towns or villages) on the basis of the sentence of the answer target question message acquired in S42. Specifically, when a word relating to a wide area is included in the sentence of the answer target question message, it is determined that the answer target question message is a question message for asking information about a wide area. The word relating to a wide area is, for example, a word, such as a prefecture name, a city name, a ward name, a town name, a village name, or a weather condition (shiny, cloudy, rainy).

When it is determined that the answer target question message is a question message for asking information about a wide area (YES in S121), the process proceeds to S122. In contrast to this, when it is determined that the answer target question message is not a question message having information about a wide area (NO in S121), that is, when it is determined that the answer target question message is a question message having information about a narrow area, such as a local incident or event, the process proceeds to S123.

In S122, the CPU 31 identifies an area that is a question target (hereinafter, referred to as question target area) on the basis of the question location associated with the answer target question message, that is, the positional information associated with the question message (question positional information) and the map information. Specifically, a prefecture, a city, a ward, a town or a village that includes the question location is identified as the question target area. In addition, the question target area may be set within a predetermined distance (for example, 50 km) about the question location. However, the question target area is set to a range wider than the question target area set in S123 (described later). The map information may be acquired from the memory 32 in the communication terminal 6 or may be acquired from an external server through communication.

On the other hand, in S123, the CPU 31 identifies a question target area on the basis of the question location associated with the answer target question message, that is, the positional information associated with the question message (question positional information) and the map information. A question target area to be identified is an area narrower than that in S1222. Specifically, the question target area is set within the predetermined distance (for example, 500 m) about the question location.

Subsequently, in S124, the CPU 31 determines whether the current location of the user is located within the question target area on the basis of the current location of the user who answers the answer target question message, acquired in S41, and the question target area identified in S122 or S123.

When it is determined that the current location of the user is located within the question target area (YES in S124), the process proceeds to S125. In contrast to this, when it is determined that the current location of the user is not located within the question target area (NO in S124), the process proceeds to S126.

In S125, because the user is located within the question target area, the CPU 31 recognizes that the user can have a correct answer to the answer target question message, and determines that "restriction on access to an answer message to be answered by the user to the answer target question message is not applied". After that, the process proceeds to S27. As a result, the answer input screen is displayed through the communication terminal 6 in S29, and the user is allowed to post an answer message to the answer target question message. Accordingly, the user who posted the question message and a third-person user are allowed to access the answer message posted as an answer to the question message.

On the other hand, in S126, because the user is not located within the question target area, the CPU 31 recognizes that the user cannot have a correct answer to the answer target question message, and determines that "restriction on access to an answer message to be answered by the user to the answer target question message is applied". After that, the process proceeds to S27. As a result, the answer input screen is not displayed through the communication terminal 6 (S28), and the user is not allowed to post an answer message to the answer target question message. Accordingly, the user who posted the question message and a third-party user are not allowed to access an answer message that is posted as an answer to the question message.

Hereinafter, the determination process in S124 to S126 will be described by way of a specific example. In FIG. 30, description will be made on the case where there are. User A and User B as respondents and the answer target question message is a question message for asking a weather condition around a question location Q specified. In the example shown in FIG. 30, User A present in a question target area 80 within a predetermined distance from the question location Q can have a correct answer to the answer target question message (that is, a weather condition around the question location Q), so it is determined that "restriction on access to an answer message to be answered by User A to the answer target question message is not applied". On the other hand, User B who is not located within the question target area 80 cannot have a correct answer to the answer target question message, so it is determined that "restriction on access to an answer message to be answered by User B to the answer target question message is applied".

As described in detail above, in the information sharing system 1 according to the first embodiment and the information sharing method used in the information sharing system 1, when operation to post a question message is conducted by the user 5 who is a questioner, information about the question message is stored in the posted message information DB 8 in association with the question location specified by the questioner (S12). On the other hand, when a request to access a question message is issued from the user 5 who is a respondent, the question message corresponding to the access request is extracted from among the question messages stored in the posted message information DB 8 (S32), and information about the question message is transmitted to the communication terminal 6, from which the access request has been issued, together with the associated question location (S33). Then, in the communication terminal 6 that has received the information about the question message, on the basis of the question location associated with the question message, that is, the positional information associated with the question message (question positional information), and the positional information of the respondent (respondent positional information), the questioner is restricted from accessing an answer message and is allowed to access only the answer message posted from a specific respondent (S28, S29), so, when the questioner accesses an answer message to the question message posted on the computer network, it is possible to restrict access to only an answer message answered by an appropriate respondent who can have an answer. As a result, it is possible to improve the reliability of information that is posted from the user 5. In addition, it is determined whether restriction on access to an answer message is applied on the basis of the contents of the question message (S43 to S45), so it is possible to appropriately apply restriction on access to only a reasonable answer message to which restriction on access should be applied. As a result, it is possible to collect information from wider-target users while improving the reliability of information. In addition, particularly, when the answer target question message is a question that requires an answer in real time, the questioner is restricted from accessing an answer message, so it is possible to appropriately apply restriction on access such that only an answer in real time is obtained for a question that requires an answer in real time. In addition, when the question message corresponds to the fixed message, it is determined whether the question message is a question that requires an answer in real time on the basis of the type of the fixed message (S63), so it is possible to accurately determine, from the sentence of the answer target question message, whether the question message is a question that requires an answer in real time. In addition, even when the answer target question message does not correspond to any fixed message, it is determined whether the answer target question message is a question that requires an answer in real time by performing a syntactic analysis on the answer target question message (S67 to S70), so it is possible to accurately determine, from the sentence of the answer target question message, whether the answer target question message is a question that requires an answer in real time. In addition, the range of a respondent who posts an answer message, to which restriction on access is applied, is set on the basis of the relationship between the question location associated with the answer target question message, that is, the positional information associated with the question message (question positional information), and the positional information that indicates the position of the respondent (respondent positional information), so it is possible to restrict access to only an answer message that is posted from an appropriate respondent present at a location at which the respondent can have an answer. In addition, restriction on access is applied to the answer message that is posted from a respondent who is located at a predetermined distance or longer apart from a location that is identified by the positional information associated with the answer target question message (question positional information), so it is possible to restrict access to only an answer message that is posted from an appropriate respondent by applying restriction on access to an answer message that is posted from a respondent present at a location at which the respondent cannot have an answer. In addition, restriction on access is applied to an answer message that is posted from a respondent that is not located at a location that is identified by the positional information associated with the question message (question positional information) within the last predetermined period of time, so it is possible to restrict access to only an answer message that is posted from an appropriate respondent by applying restriction on access to an answer message that is posted from a respondent present at a location at which the respondent cannot have an answer. In addition, the range of a respondent who posts an answer message, to which restriction an access is applied, is set on the basis of the relationship between the question location associated with the answer target question message, that is, the positional information associated with the question message (question positional information), and the positional information that indicates the location of the respondent at the time point at which the question message was posted or the time point at which an answer message to the question message is posted (respondent positional information), so it is possible to restrict access to only an answer message that is posted from an appropriate respondent present at a location at which the respondent can have an answer. In addition, the questioner is restricted from accessing an answer message by restricting the questioner from inputting the answer message to the communication terminal 6, so, at the time when the respondent is caused to answer the question message posted on the computer network, it is possible to cause only an appropriate respondent who can have an answer to input an answer message to the terminal. As a result, it is possible to improve the reliability of information that is posted from the user 5. In addition, a location on the map, specified by the questioner, is acquired as the question location, that is, the positional information associated with the question message (question positional information), so it is possible to appropriately set the range of a respondent who can have an answer to the question message on the basis of the location on the map, specified by the questioner. In addition, when the question icon 62 displayed at a location that is identified by the question location associated with the question message is selected by the user, the question message is output from the communication terminal 6, so it is possible to output from the communication terminal 6 a location on the map and a question message relating to the location in association with each other. Thus, the user is able to easily select a question message, intended to be accessed, on the map and output the question message. In addition, when the question icon 62 displayed at the location that is identified by the question location associated with the question message is selected by the user, an answer message to the question message is output from the communication terminal 6 together with the question message, so it is possible to output from the terminal a question message and an answer message in association with each other.

Second Embodiment

Figure 31:
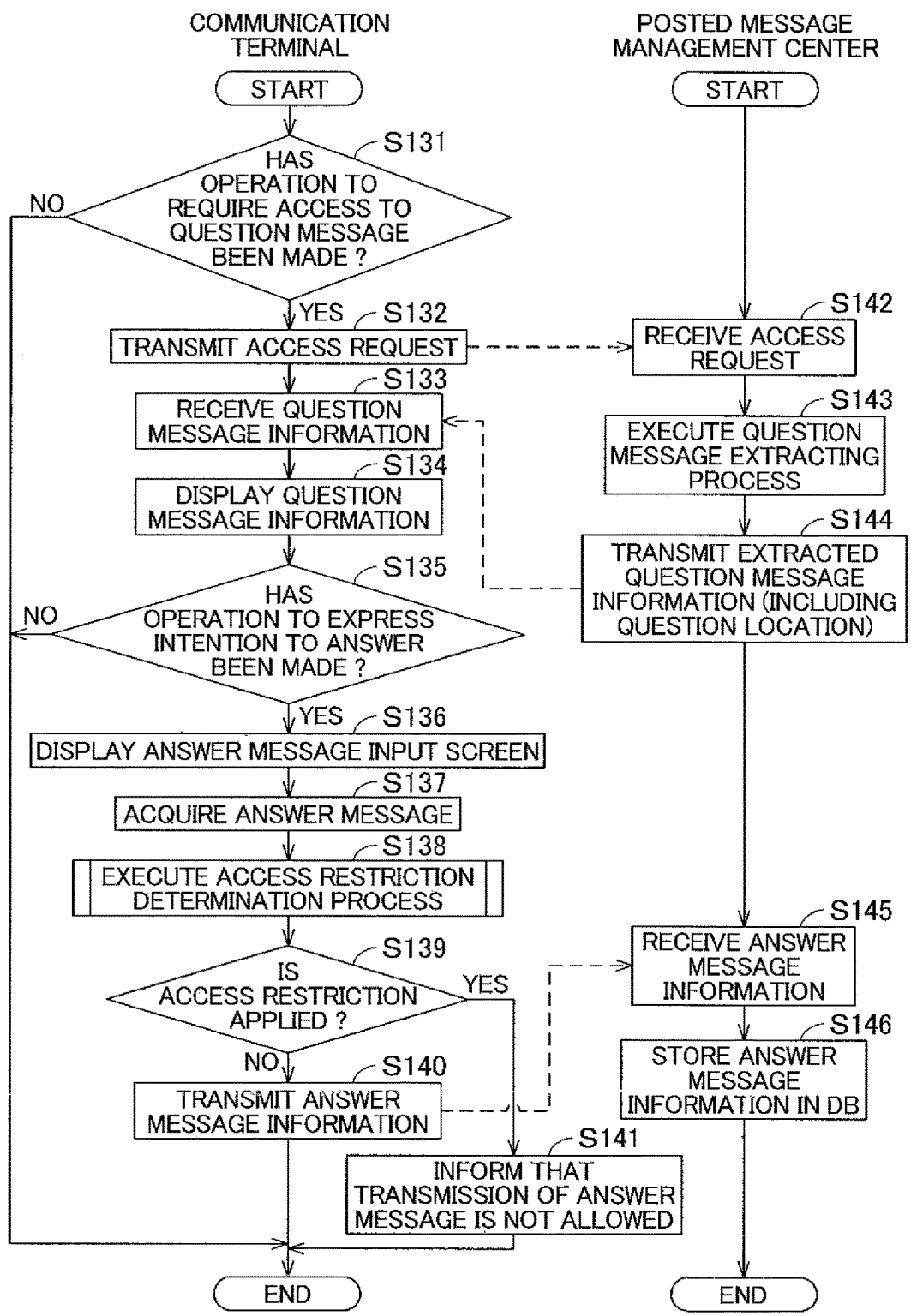
FIG. 31 is a flowchart of an answer message posting process program according to a second embodiment.

Next, an information sharing system according to a second embodiment will be described with reference to FIG. 31 and FIG. 32. In the following description, like reference numerals to those of the configuration of the information sharing system 1 according to the first embodiment in FIG. 1 to FIG. 30 denote the same or corresponding portions of the configuration of the information sharing system 1, and the like, according to the first embodiment.

The schematic configuration of the information sharing system according to the second embodiment is substantially the same as the configuration of the information sharing system 1 according to the first embodiment. Various control processes are also substantially the same as the control processes of the information sharing system 1 according to the first embodiment. However, the information sharing system 1 according to the first embodiment restricts a user who posted a question message or a third-person user from accessing an answer message by causing a respondent not to input an answer message; whereas the information sharing system according to the second embodiment differs from the information sharing system 1 according to the first embodiment in that a user who posted a question message or a third-person user is restricted from accessing an answer message by causing an answer message input by a respondent not to be transmitted from the communication terminal 6 to the posted message management center 2.

Hereinafter, an answer message posting process program that is executed in the communication terminal 6 and the posted message management center 2 according to the second embodiment will be described with reference to FIG. 31. FIG. 31 is a flowchart of the answer message posting process program according to the second embodiment.

First, the answer message posting process program that is executed in the communication terminal 6 will be described. In S131, the CPU 31 determines whether operation to require access to a question message has been made on the basis of user's operation accepted by the input operation unit 39.

Then, as a result of determination in S131, when it is determined that operation to require access to the question message has been made in the input operation unit 39 (YES in S131), the process proceeds to S132. In contrast to this, when it is determined that operation to require access to the question message has not been made by the input operation unit 39 (NO in S131), the answer message posting process program is ended.

In S132, the CPU 31 transmits a request to access the question message based on user's operation to the posted message management center 2. Specifically, when the question icon 62 (see FIG. 10) has been selected on the map image 61, an access request to require access to the question message corresponding to the selected question icon 62 is transmitted; whereas, when a retrieval condition has been input, an access request to require access to a question message corresponding to the retrieval condition is transmitted. The posted message management center 2, upon reception of the access request to a question message, extracts the question message corresponding to the access request (for example, when the question icon 62 has been selected on the map image 61 as shown in FIG. 10, the question message associated with the selected question icon 62) from among posted messages posted on the computer network on the basis of the received access request (S143) as will be described later. When an answer message has been already posted for the question message corresponding to the access request, the answer message is also extracted.

Subsequently, in S133, the CPU 31 receives information about the question message transmitted from the posted message management center 2. The information about the question message received in S133 is information about the question message extracted from among the question messages posted on the computer network on the basis of the access request transmitted in S132. In addition, information about a posted message includes, in addition to the sentence of the posted message, posted time at which the posted message was posted, the type of posted message (that is, the question message), a question location, contributor's ID, and the like. When the information about the answer message has also been transmitted from the posted message management center 2, the information about the answer message is also received.

Subsequently, in S134, the CPU 31 displays the information about the question message, received in S133, on the display 38 (see FIG. 11). Specifically, the sentence of the question message, the posted time at which the question message was posted and the contributor's ID are displayed. In addition, voice that reads the question message may be output from the speaker 36. The posted time and the contributor's ID may be configured not to be displayed. Furthermore, when there has been already an answer to the question message received in S133, the answer message that has been answered till present time is also displayed.

After that, in S135, the CPU 31 determines whether operation that the user expresses an intention to answer the question message displayed on the display 38 in S134 has been made on the basis of user's operation accepted by the input operation unit 39. Specifically, as shown in FIG. 13, when the user has selected the answer button 64 displayed together with the question message on the window 63 of the display 38, it is determined that operation that the user expresses an intention to answer the displayed question message has been made.

Then, when it is determined that operation that the user expresses an intention to answer the displayed question message has been made (YES in S135), the process proceeds to S136. In contrast to this, when it is determined that operation that the user expresses an intention to answer the displayed question message has not been made (NO in S135), the answer message posting process program is ended.

In S136, the CPU 31 displays an answer message input screen for inputting an answer message on the display 38. The answer message input screen is a screen for allowing the user to input an answer message.

Subsequently, in S137, the CPU 31 acquires the sentence of the answer message on the basis of user's operation input via the input operation unit 39. The sentence of the answer message is selected by the user from fixed messages displayed on the display 38 as described above or an arbitrary sentence input by the user (see FIG. 15 and FIG. 16).

Subsequently, in S138, the CPU 31 executes the above-described access restriction determination process (FIG. 18). Here, as described above, the access restriction determination process is a process of determining whether restriction on access to an answer message to be answered by the user to the question message is applied on the basis of the question location associated with the question message acquired in S133, that is, positional information (question positional information) and the question contents, associated with the question message, the current location (respondent positional information) of the user (that is, the respondent), and the like. The details of the access restriction determination process in S138 are similar to those of the first embodiment, so the description is omitted.

After that, in S139, the CPU 31 determines whether the determination result of the access restriction determination process in S138 is the result that "restriction on access to an answer message to be answered by the user is applied".

When the determination result of the access restriction determination process in S138 is the determination result that "restriction on access to an answer message to be answered by the user is not applied" (NO in S139), the process proceeds to S140.

In S140, the CPU 31 transmits the posted time at which the answer message was posted, the contributor's ID and the type of posted message (that is, the answer message) together with the sentence of the answer message acquired in S137 to the posted message management center 2 as answer message information.

On the other hand, when the determination result of the access restriction determination process in S138 is the determination result that "restriction on access to an answer message to be answered by the user is applied" (YES in S139), the process proceeds to S141 without transmitting the answer message information to the posted message management center 2.

Figure 32:
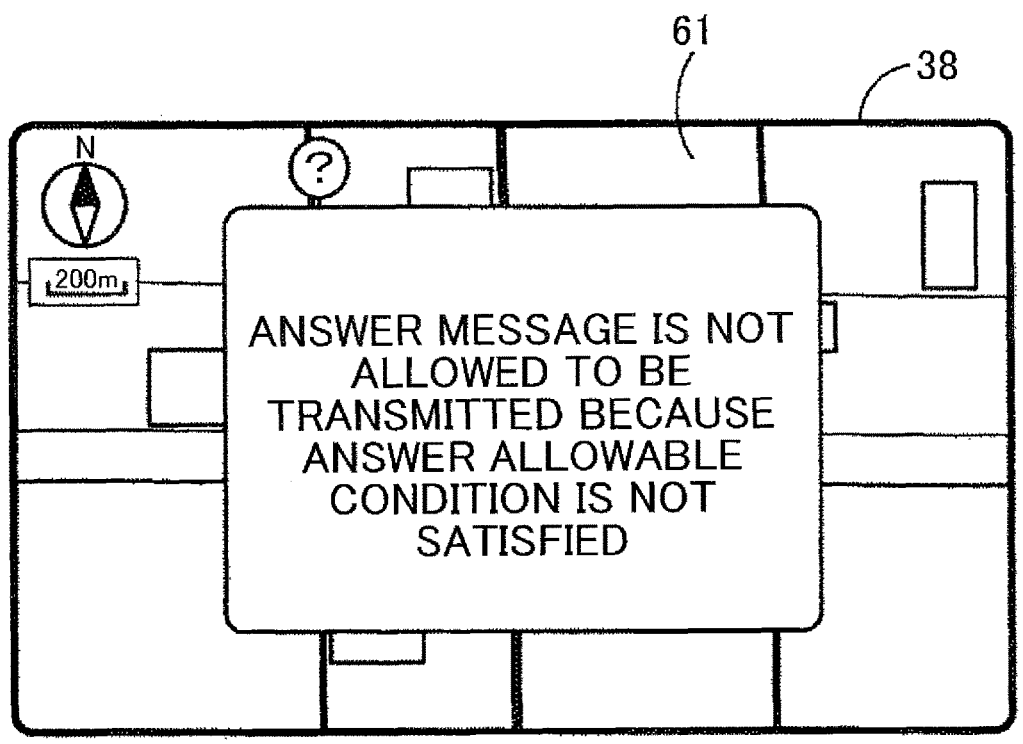
FIG. 32 is a view that shows a display screen that is displayed on a display in the case where transmission of an answer message is restricted.

In S141, the CPU 31 informs that the answer message is not transmitted to the posted message management center 2 because the user does not satisfy a condition for allowing access to an answer message to be posted as shown in FIG. 32. Then, the answer message posting process program is ended without transmitting the input answer message to the posted message management center 2. As a result, the user who posted the question message and a third-person user are restricted from accessing the answer message.

Next, the answer message posting process program that is executed in the posted message management center 2 will be described. Initially, in S142, the CPU 21 receives the request to access the question message, transmitted from the communication terminal 6.

Subsequently, in S143, the CPU 21 executes retrieval process of retrieving a question message corresponding to the access request from among the posted messages posted on the computer network on the basis of the access request to the question message, received in S142. Specifically, information about the question message corresponding to the access request is extracted from the posted message information (FIG. 3) stored in the posted message information DB 8. Information about a question message to be extracted also includes the question location of the question message, that is, the positional information associated with the question message (question positional information).

After that, in S144, the CPU 21 transmits information about the question message extracted in S143 (including the question location) to the communication terminal 6 that has required to access the question message. As a result, in the communication terminal 6 that has issued the request to access the question message, the information about the question message intended by the user is output (S134).

In S145, the CPU 21 receives the answer message information transmitted from the communication terminal 6.

Subsequently, in S146, the CPU 21 stores the answer message information, received in S145, in the posted message information DB 8 (FIG. 3). The answer message information stored in the posted message information DB 8 is configured to be accessible from the communication terminal 6.

As described in detail above, in the information sharing system according to the second embodiment and the information sharing method used in the information sharing system, the questioner is restricted from accessing the answer message by restricting transmission of the answer message from the communication terminal 6 to the posted message management center 2 after the answer message is input to the communication terminal 6, so, at the time when a respondent is caused to answer the question message posted on the computer network, it is possible to cause only the terminal of an appropriate respondent who can have an answer to transmit an answer message to the server. As a result, it is possible to improve the reliability of information that is posted from the user.

The above-described embodiments are not limiting. Of course, various improvements and modifications are possible. For example, in the first embodiment and the second embodiment, the communication terminal 6 is configured to execute the access restriction determination process in S26, S138 of the answer message posting process program (FIG. 12, FIG. 31); instead, the posted message management center 2 may be configured to execute part or all of the process. In this case, the determination result of the access restriction determination process is configured to be transmitted from the posted message management center 2 to the communication terminal 6.

In addition, in the first embodiment and the second embodiment, in the access restriction determination process (S24, S138), it is determined whether restriction on access to an answer message is applied on the basis of the relationship between a question location associated with an answer target question message, that is, positional information associated with the question message (question positional information), and the current location of a respondent (that is, the location of a respondent at the time point at which the respondent posts an answer message to the question message); instead, it may be determined whether restriction on access to an answer message is applied on the basis of the relationship between a question location associated with an answer target question message, that is, positional information associated with the question message (question positional information), and the location of a respondent at the time when the answer target question message was posted. Specifically, in S41, the location of the respondent at the time when the answer target question message was posted is identified from the history of the location of the user, stored in the memory 32. Then, in the process after S42, the process is executed using the location of the respondent at the time when the answer target question message was posted, instead of the current location. Thus, it is possible to restrict access to an answer message posted from only a respondent who can have a situation at the time point closer to the time point at which a questioner asked a question.

In addition, in the first embodiment and the second embodiment, information about a question location arbitrarily specified by a questioner on the map at the question time point is used as positional information associated with the question message (question positional information); instead, positional information that indicates the location of a questioner at the time when a question message was posted (posted positional information) may also be used. In addition, an administrative section, a link number, a facility ID, or the like, may be associated as positional information instead of location coordinates.

The invention claimed is:

1. An information sharing system in which, on a computer network formed of terminals of users and a server, information about a posted message posted by a user is shared among the users, the information sharing system comprising:
an electronic control unit including a processor programmed to:
acquire a question message input via a terminal together with positional information associated with the question message;
cause the acquired question message to be accessible to the users on the computer network;
acquire an answer message input via a sending terminal as an answer to the question message;
cause the acquired answer message to be accessible to the users on the computer network;
acquire positional information of a respondent that is one of the users that inputs the answer message;
restrict a questioner that is another one of the users that posted the question message from accessing the answer message based on question positional information that is the positional information associated with the question message and respondent positional information that is the acquired positional information of the respondent;
determine whether the question message is a question that requires an answer in real-time based on contents of the question message;
determine a type of an object that is a target for the question of the question message;
in response to determining that the question message requires the answer in real-time, set an access restriction condition based on the type of the object and the question positional information and restrict access to the answer message responsive to the respondent positional information satisfying the access restriction condition; and
in response to determining that the question message does not require the answer in real-time, allow the answer message to be accessed by the questioner and do not set the access restriction on the answer message.

2. The information sharing system according to claim 1, wherein the processor of the electronic control unit is programmed to:
acquire correspondence relationship information that associates whether the question requires an answer in real time with each of multiple-type fixed messages; and
determine whether the question message requires the answer in real time on the basis of the correspondence relationship information when the question message corresponds to any one of the multiple-type fixed messages.

3. The information sharing system according to claim 1, wherein the processor of the electronic control unit is programmed to determine whether the question message requires an answer in real time by performing a syntactic analysis on the question message.

4. The information sharing system according to claim 1, wherein the processor of the electronic control unit is programmed to set a range of the respondent who posts the answer message, to which restriction on access is applied, on the basis of a relationship between the question positional information and the respondent positional information.

5. The information sharing system according to claim 4, wherein the processor of the electronic control unit is programmed to apply the restriction on access to the answer message that is posted from the respondent who is located a predetermined distance or longer apart from a location that is identified by the question positional information.

6. The information sharing system according to claim 4, wherein the processor of the electronic control unit is programmed to apply the restriction on access to the answer message that is posted from the respondent who is not located at a location that is identified by the question positional information within a last predetermined period of time.

7. The information sharing system according to claim 4, wherein the processor of the electronic control unit is programmed to set the range of the respondent who posts the answer message, to which restriction on access is applied, on the basis of the relationship between the question positional information and the respondent positional information that indicates a location of the respondent at the time point at which the question message was posted or the time point at which the answer message to the question message is posted.

8. The information sharing system according to claim 1, wherein the processor of the electronic control unit is programmed to:
accept transmission the acquired answer message from the sending terminal to the server;
store the transmitted answer message in the server;
distribute the stored answer message from the server to an access terminal that intends to access the answer message for output on the access terminal; and
restrict the questioner from accessing the answer message by restricting the transmission of the answer message from the sending terminal to the server.

9. The information sharing system according to claim 1, wherein the processor of the electronic control unit is programmed to acquire information that identifies a location on a map, specified by the questioner, as the question positional information.

10. The information sharing system according to claim 1, wherein the processor of the electronic control unit is programmed to:
display a map image on the access terminal;
display a selection target at the location that is identified by the question positional information, associated with the acquired question message, on the map image displayed on an access terminal; and
when the selection target has been selected by a user, output the acquired question message from the sending terminal.

11. The information sharing system according to claim 10, wherein the processor of the electronic control unit is programmed to output the answer message together with the question message when the selection target displayed at the location that is identified by the question positional information, associated with the question message to which the answer message is made, has been selected by the user.

12. An information sharing method in which, on a computer network formed of terminals of users and a server, information about a posted message posted by a user is shared among the users, the method comprising:
question message information acquisition step of acquiring a question message input via the terminal together with positional information associated with the question message;
question message accessing step of causing the question message acquired in the question message information acquisition step to be accessible to the users on the computer network;
answer message information acquisition step of acquiring an answer message input via the terminal as an answer to the question message;
answer message accessing step of causing the answer message acquired in the answer message information acquisition step to be accessible to the users on the computer network;
respondent positional information acquisition step of acquiring positional information of a respondent that is one of the users that inputs the answer message;
access restriction step of restricting a questioner that is the user who posted the question message from accessing the answer message on the basis of question positional information that is the positional information associated with the question message and respondent positional information that is the positional information of the respondent, acquired in the respondent positional information acquisition step;
a first determining step of determining whether the question message is a question that requires an answer in real-time based on contents of the question message;
a second determining step of determining a type of an object that is a target for the question of the question message;
in response to determining that the question message requires the answer in real-time, an access restriction condition setting step of setting an access restriction condition based on the type of the object and the question positional information and restricting access to the answer message responsive to the respondent positional information satisfying the access restriction condition; and
in response to determining that the question message does not require the answer in real-time, an access allowing step of allowing the answer message to be accessed by the questioner and do not set the access restriction on the answer message.

13. A non-transitory computer-readable storage medium storing a computer-executable program for sharing information about a posted message posted by a user among a plurality of users, the program comprising:
instructions for acquiring a question message input via an operating unit together with positional information associated with the question message;
instructions for causing the acquired question message to be accessible to the users on the computer network;
instructions for acquiring an answer message input via the operating unit as an answer to the question message;
instructions for causing the acquired answer message to be accessible to the users on the computer network;
instructions for acquiring positional information of a respondent that is one of the users that inputs the answer message;
instructions for restricting a questioner that is the user who posted the question message from accessing the answer message on the basis of question positional information that is the positional information associated with the question message and respondent positional information that is the acquired positional information of the respondent;
instructions for determining whether the question message is a question that requires an answer in real-time based on contents of the question message;

instructions for determining a type of an object that is a target for the question of the question message;

instructions for, in response to determining that the question message requires the answer in real-time, setting an access restriction condition based on the type of the object and the question positional information and restricting access to the answer message responsive to the respondent positional information satisfying the access restriction condition; and instructions for, in response to determining that the question message does not require the answer in real-time, allowing the answer message to be accessed by the questioner and do not set the access restriction on the answer message.

* * * * *